United States Patent
Prevost et al.

(10) Patent No.: US 12,492,725 B2
(45) Date of Patent: Dec. 9, 2025

(54) POLYCRYSTALLINE DIAMOND-ON-METAL BEARINGS FOR USE IN CRYOGENIC CONDITIONS

(71) Applicant: Pi Tech Innovations LLC, Houston, TX (US)

(72) Inventors: Gregory Prevost, Spring, TX (US); Edward C. Spatz, Spring, TX (US); William W. King, Houston, TX (US)

(73) Assignee: Pi Tech Innovations LLC, Houston, TX (US)

( * ) Notice: Subject to any disclaimer, the term of this patent is extended or adjusted under 35 U.S.C. 154(b) by 200 days.

(21) Appl. No.: 18/299,399

(22) Filed: Apr. 12, 2023

(65) Prior Publication Data

US 2023/0332643 A1    Oct. 19, 2023

Related U.S. Application Data

(60) Provisional application No. 63/330,619, filed on Apr. 13, 2022.

(51) Int. Cl.
*F16C 33/12* (2006.01)
*F16C 17/02* (2006.01)
*F16C 33/04* (2006.01)

(52) U.S. Cl.
CPC ............ *F16C 33/121* (2013.01); *F16C 17/02* (2013.01); *F16C 33/043* (2013.01); *F16C 2204/60* (2013.01); *F16C 2206/04* (2013.01)

(58) Field of Classification Search
CPC ...... F16C 17/02; F16C 33/043; F16C 33/121; F16C 33/26; F16C 37/00; F16C 37/007; F16C 2206/04
See application file for complete search history.

(56) References Cited

U.S. PATENT DOCUMENTS

| 729,694 A | 6/1903 | Stewart |
| 1,798,604 A | 3/1931 | Hoke |
| 1,963,956 A | 6/1934 | James |

(Continued)

FOREIGN PATENT DOCUMENTS

| CA | 1286655 C | 7/1991 |
| CA | 2891268 A1 | 11/2016 |

(Continued)

OTHER PUBLICATIONS

Hudson Bearings Air Cargo Ball Transfers brochure, accessed on Jun. 23, 2018, 8 Pages, Columbus, Ohio.

(Continued)

*Primary Examiner* — Alan B Waits
(74) *Attorney, Agent, or Firm* — Michael S. McCoy; Amatong McCoy LLC

(57) ABSTRACT

Bearing assemblies for use in low-temperature conditions are provided. The bearing assemblies include polycrystalline diamond bearing elements having diamond bearing surfaces and opposing bearing elements having metal bearing surfaces. The metal bearing surfaces include a metal that contains at least 2 weight percent of a diamond solvent-catalyst based on a total weight of the metal. The metal is ductile at temperatures ranging from −150° C. to −253° C. The metal bearing surface is in sliding contact with the diamond bearing surface.

50 Claims, 3 Drawing Sheets

(56) References Cited

U.S. PATENT DOCUMENTS

| | | | |
|---|---|---|---|
| 2,259,023 | A | 10/1941 | Clark |
| 2,299,978 | A | 10/1942 | Hall |
| 2,407,586 | A | 9/1946 | Summers |
| 2,499,030 | A | 2/1950 | Moon |
| 2,567,735 | A | 9/1951 | Scott |
| 2,693,396 | A | 11/1954 | Gondek |
| 2,758,181 | A | 8/1956 | Crouch |
| 2,788,677 | A | 4/1957 | Hayek |
| 2,877,662 | A | 3/1959 | Eduard |
| 2,897,016 | A | 7/1959 | Baker |
| 2,947,609 | A | 8/1960 | Strong |
| 2,947,610 | A | 8/1960 | Hall et al. |
| 3,132,904 | A | 5/1964 | Kohei et al. |
| 3,559,802 | A | 2/1971 | Eidus |
| 3,582,161 | A | 6/1971 | Hudson |
| 3,603,652 | A | 9/1971 | Youden |
| 3,650,714 | A | 3/1972 | Farkas |
| 3,697,141 | A | 10/1972 | Garrett |
| 3,707,107 | A | 12/1972 | Bieri |
| 3,741,252 | A | 6/1973 | Williams |
| 3,745,623 | A | 7/1973 | Wentorf et al. |
| 3,752,541 | A | 8/1973 | Mcvey |
| 3,866,987 | A | 2/1975 | Garner |
| 3,869,947 | A | 3/1975 | Vandenkieboom |
| 3,920,290 | A | 11/1975 | Evarts |
| 4,085,634 | A | 4/1978 | Sattler |
| 4,182,537 | A | 1/1980 | Oster |
| 4,225,322 | A | 9/1980 | Knemeyer |
| 4,238,137 | A | 12/1980 | Furchak et al. |
| 4,275,935 | A | 6/1981 | Thompson et al. |
| 4,285,550 | A | 8/1981 | Blackburn et al. |
| 4,364,136 | A | 12/1982 | Hattan |
| 4,382,637 | A | 5/1983 | Blackburn et al. |
| 4,398,772 | A | 8/1983 | Odell |
| 4,410,054 | A | 10/1983 | Nagel et al. |
| 4,410,284 | A | 10/1983 | Herrick |
| 4,428,627 | A | 1/1984 | Teramachi |
| 4,432,682 | A | 2/1984 | McKewan |
| 4,468,138 | A | 8/1984 | Nagel |
| 4,525,178 | A | 6/1985 | Hall |
| 4,554,208 | A | 11/1985 | MacIver et al. |
| 4,560,014 | A | 12/1985 | Geczy |
| 4,620,601 | A | 11/1986 | Nagel |
| RE32,380 | E | 3/1987 | Wentorf, Jr. et al. |
| 4,662,348 | A | 5/1987 | Hall et al. |
| 4,679,639 | A | 7/1987 | Barr et al. |
| 4,689,847 | A | 9/1987 | Huber |
| 4,720,199 | A | 1/1988 | Geczy et al. |
| 4,729,440 | A | 3/1988 | Hall |
| 4,732,490 | A | 3/1988 | Masciarelli |
| 4,738,322 | A | 4/1988 | Hall et al. |
| 4,764,036 | A | 8/1988 | Mcpherson |
| 4,796,670 | A | 1/1989 | Russell et al. |
| 4,797,011 | A | 1/1989 | Saeki et al. |
| 4,858,688 | A | 8/1989 | Edwards et al. |
| 4,906,528 | A | 3/1990 | Cerceau et al. |
| 4,958,692 | A | 9/1990 | Anderson |
| 5,011,514 | A | 4/1991 | Cho et al. |
| 5,011,515 | A | 4/1991 | Frushour |
| 5,030,276 | A | 7/1991 | Sung et al. |
| 5,037,212 | A | 8/1991 | Justman et al. |
| 5,066,145 | A | 11/1991 | Sibley et al. |
| 5,067,826 | A | 11/1991 | Lemelson |
| 5,092,687 | A | 3/1992 | Hall |
| 5,112,146 | A | 5/1992 | Stangeland |
| 5,123,772 | A | 6/1992 | Anderson |
| 5,151,107 | A | 9/1992 | Cho et al. |
| 5,176,483 | A | 1/1993 | Baumann et al. |
| 5,193,363 | A | 3/1993 | Petty |
| 5,205,188 | A | 4/1993 | Repenning et al. |
| 5,253,939 | A | 10/1993 | Hall |
| 5,271,749 | A | 12/1993 | Rai et al. |
| 5,351,770 | A | 10/1994 | Cawthorne et al. |
| 5,358,041 | A | 10/1994 | O'Hair |
| 5,358,337 | A | 10/1994 | Codatto |
| 5,364,192 | A | 11/1994 | Damm et al. |
| 5,375,679 | A | 12/1994 | Biehl |
| 5,385,715 | A | 1/1995 | Fish |
| 5,447,208 | A | 9/1995 | Lund et al. |
| 5,462,362 | A | 10/1995 | Yuhta et al. |
| 5,464,086 | A | 11/1995 | Coelln |
| 5,514,183 | A | 5/1996 | Epstein et al. |
| 5,522,467 | A | 6/1996 | Stevens et al. |
| 5,533,604 | A | 7/1996 | Brierton |
| 5,538,346 | A | 7/1996 | Frias et al. |
| 5,540,314 | A | 7/1996 | Coelln |
| 5,560,716 | A | 10/1996 | Tank et al. |
| 5,618,114 | A | 4/1997 | Katahira |
| 5,645,617 | A | 7/1997 | Frushour |
| 5,653,146 | A | 8/1997 | Barton |
| 5,653,300 | A | 8/1997 | Lund et al. |
| 5,715,898 | A | 2/1998 | Anderson |
| 5,833,019 | A | 11/1998 | Gynz-Rekowski |
| 5,855,996 | A | 1/1999 | Corrigan et al. |
| 5,948,541 | A | 9/1999 | Inspektor |
| 6,045,029 | A | 4/2000 | Scott |
| 6,109,790 | A | 8/2000 | Gynz-Rekowski et al. |
| 6,120,185 | A | 9/2000 | Masciarelli |
| 6,129,195 | A | 10/2000 | Matheny |
| 6,152,223 | A | 11/2000 | Abdo et al. |
| 6,164,109 | A | 12/2000 | Bartosch |
| 6,190,050 | B1 | 2/2001 | Campbell |
| 6,209,185 | B1 | 4/2001 | Scott |
| 6,279,716 | B1 | 8/2001 | Kayatani et al. |
| 6,378,633 | B1 | 4/2002 | Moore et al. |
| 6,409,388 | B1 | 6/2002 | Lin |
| 6,457,865 | B1 | 10/2002 | Masciarelli, Jr. |
| 6,488,103 | B1 | 12/2002 | Dennis et al. |
| 6,488,715 | B1 | 12/2002 | Pope et al. |
| 6,516,934 | B2 | 2/2003 | Masciarelli, Jr. |
| 6,517,583 | B1 | 2/2003 | Pope et al. |
| 6,652,201 | B2 | 11/2003 | Kunimori et al. |
| 6,655,845 | B1 | 12/2003 | Pope et al. |
| 6,737,377 | B1 | 5/2004 | Sumiya et al. |
| 6,764,219 | B2 | 7/2004 | Doll et al. |
| 6,808,019 | B1 | 10/2004 | Mabry |
| 6,814,775 | B2 | 11/2004 | Scurlock et al. |
| 6,951,578 | B1 | 10/2005 | Belnap et al. |
| 7,007,787 | B2 | 3/2006 | Pallini et al. |
| 7,128,173 | B2 | 10/2006 | Lin |
| 7,198,043 | B1 | 4/2007 | Zhang |
| 7,234,541 | B2 | 6/2007 | Scott et al. |
| 7,296,965 | B2 | 11/2007 | Cooper et al. |
| 7,311,159 | B2 | 12/2007 | Lin et al. |
| 7,441,610 | B2 | 10/2008 | Belnap et al. |
| 7,475,744 | B2 | 1/2009 | Pope |
| 7,552,782 | B1 | 6/2009 | Sexton et al. |
| 7,703,982 | B2 | 4/2010 | Cooley |
| 7,737,377 | B1 | 6/2010 | Dodal et al. |
| 7,743,654 | B2 | 6/2010 | Spross et al. |
| 7,845,436 | B2 | 12/2010 | Cooley et al. |
| 7,861,805 | B2 | 1/2011 | Dick et al. |
| 7,870,913 | B1 | 1/2011 | Sexton et al. |
| 8,069,933 | B2 | 12/2011 | Sexton et al. |
| 8,080,071 | B1 | 12/2011 | Vail |
| 8,109,247 | B2 | 2/2012 | Wakade et al. |
| 8,119,240 | B2 | 2/2012 | Cooper |
| 8,163,232 | B2 | 4/2012 | Fang et al. |
| 8,235,767 | B2 | 8/2012 | Ferrell et al. |
| 8,277,124 | B2 | 10/2012 | Sexton et al. |
| 8,277,722 | B2 | 10/2012 | DiGiovanni |
| 8,365,846 | B2 | 2/2013 | Dourfaye et al. |
| 8,435,317 | B2 | 5/2013 | Burgess et al. |
| 8,480,304 | B1 | 7/2013 | Cooley et al. |
| 8,485,284 | B2 | 7/2013 | Sithebe |
| 8,582,161 | B2 | 11/2013 | Okada et al. |
| 8,613,554 | B2 | 12/2013 | Tessier et al. |
| 8,627,904 | B2 | 1/2014 | Voronin |
| 8,678,657 | B1 | 3/2014 | Knuteson et al. |
| 8,701,797 | B2 | 4/2014 | Baudoin |
| 8,702,824 | B1 | 4/2014 | Sani et al. |
| 8,734,550 | B1 | 5/2014 | Sani |
| 8,757,299 | B2 | 6/2014 | DiGiovanni et al. |
| 8,763,727 | B1 | 7/2014 | Cooley et al. |

(56) References Cited

U.S. PATENT DOCUMENTS

| | | |
|---|---|---|
| 8,764,295 B2 | 7/2014 | Dadson et al. |
| 8,789,281 B1 | 7/2014 | Sexton et al. |
| 8,833,635 B1 | 9/2014 | Peterson |
| 8,881,849 B2 | 11/2014 | Shen et al. |
| 8,911,521 B1 | 12/2014 | Miess et al. |
| 8,939,652 B2 | 1/2015 | Peterson et al. |
| 8,974,559 B2 | 3/2015 | Frushour |
| 9,004,198 B2 | 4/2015 | Kulkarni |
| 9,010,418 B2 | 4/2015 | Pereyra et al. |
| 9,022,149 B2 | 5/2015 | Lyons |
| 9,045,941 B2 | 6/2015 | Chustz |
| 9,097,100 B2 | 8/2015 | Finke et al. |
| 9,103,172 B1 | 8/2015 | Bertagnolli et al. |
| 9,127,713 B1 | 9/2015 | Lu |
| 9,145,743 B2 | 9/2015 | Shen et al. |
| 9,151,326 B1 | 10/2015 | Peterson et al. |
| 9,194,187 B2 | 11/2015 | Cox et al. |
| 9,222,515 B2 | 12/2015 | Chang |
| 9,273,381 B2 | 3/2016 | Qian et al. |
| 9,284,980 B1 | 3/2016 | Miess |
| 9,309,923 B1 | 4/2016 | Lingwall et al. |
| 9,353,788 B1 | 5/2016 | Tulett et al. |
| 9,366,085 B2 | 6/2016 | Panahi |
| 9,404,310 B1 | 8/2016 | Sani et al. |
| 9,410,573 B1 | 8/2016 | Lu |
| 9,429,188 B2 | 8/2016 | Peterson et al. |
| 9,488,221 B2 | 11/2016 | Gonzalez |
| 9,562,562 B2 | 2/2017 | Peterson |
| 9,611,885 B1 | 4/2017 | Cooley et al. |
| 9,643,293 B1 | 5/2017 | Miess et al. |
| 9,702,198 B1 | 7/2017 | Topham |
| 9,702,401 B2 | 7/2017 | Gonzalez |
| 9,732,791 B1 | 8/2017 | Gonzalez |
| 9,776,917 B2 | 10/2017 | Tessitore et al. |
| 9,790,749 B2 | 10/2017 | Chen |
| 9,790,818 B2 | 10/2017 | Berruet et al. |
| 9,803,432 B2 | 10/2017 | Wood et al. |
| 9,822,523 B1 | 11/2017 | Miess |
| 9,840,875 B2 | 12/2017 | Harvey et al. |
| 9,869,135 B1 | 1/2018 | Martin |
| 10,018,146 B2 | 7/2018 | Azevedo et al. |
| 10,060,192 B1 | 8/2018 | Miess et al. |
| 10,067,258 B2 | 9/2018 | Hill et al. |
| 10,113,362 B2 | 10/2018 | Ritchie et al. |
| 10,124,416 B2 | 11/2018 | Aliaga et al. |
| 10,273,800 B2 | 4/2019 | Downie et al. |
| 10,279,454 B2 | 5/2019 | DiGiovanni et al. |
| 10,280,735 B2 | 5/2019 | Finke et al. |
| 10,294,986 B2 | 5/2019 | Gonzalez |
| 10,307,891 B2 | 6/2019 | Daniels et al. |
| 10,408,086 B1 | 9/2019 | Meier |
| 10,465,775 B1* | 11/2019 | Miess .................. F16H 53/06 |
| 10,584,534 B2 | 3/2020 | Hagar et al. |
| 10,683,895 B2 | 6/2020 | Hall et al. |
| 10,711,792 B2 | 7/2020 | Vidalenc et al. |
| 10,711,833 B2 | 7/2020 | Manwill et al. |
| 10,738,821 B2 | 8/2020 | Miess et al. |
| 10,807,913 B1 | 10/2020 | Hawks et al. |
| 10,823,871 B2 | 11/2020 | Donderici |
| 10,968,700 B1 | 4/2021 | Raymond |
| 10,968,703 B2 | 4/2021 | Haugvaldstad et al. |
| 10,968,946 B2 | 4/2021 | Doehring et al. |
| 11,054,000 B2 | 7/2021 | Prevost et al. |
| 11,085,488 B2 | 8/2021 | Gonzalez |
| 11,118,408 B2 | 9/2021 | Marshall et al. |
| 11,187,040 B2 | 11/2021 | Prevost et al. |
| 11,242,891 B2 | 2/2022 | Miess et al. |
| 11,608,729 B2 | 3/2023 | Hay et al. |
| 11,608,735 B2 | 3/2023 | Wisinger, Jr. |
| 11,608,858 B2 | 3/2023 | Prevost et al. |
| 11,614,126 B2 | 3/2023 | Prevost |
| 11,619,123 B2 | 4/2023 | Dunbar |
| 11,643,929 B2 | 5/2023 | Harrigan |
| 11,655,850 B2 | 5/2023 | Prevost et al. |
| 11,680,478 B2 | 6/2023 | Simeonov et al. |
| 11,761,481 B2 | 9/2023 | Miess et al. |
| 11,802,443 B2 | 10/2023 | Peters et al. |
| 11,933,356 B1 | 3/2024 | Prevost et al. |
| 11,994,006 B2 | 5/2024 | Prevost et al. |
| 12,006,973 B2 | 6/2024 | Prevost et al. |
| 12,031,574 B2 | 7/2024 | Varghese et al. |
| 2002/0020526 A1 | 2/2002 | Male et al. |
| 2002/0076273 A1 | 6/2002 | Carstensen |
| 2002/0183122 A1 | 12/2002 | Sone et al. |
| 2003/0019106 A1 | 1/2003 | Pope et al. |
| 2003/0075363 A1 | 4/2003 | Lin et al. |
| 2003/0159834 A1 | 8/2003 | Kirk et al. |
| 2003/0220691 A1 | 11/2003 | Songer et al. |
| 2004/0031625 A1 | 2/2004 | Lin et al. |
| 2004/0134687 A1 | 7/2004 | Radford et al. |
| 2004/0163822 A1 | 8/2004 | Zhang et al. |
| 2004/0219362 A1 | 11/2004 | Wort et al. |
| 2004/0223676 A1 | 11/2004 | Pope et al. |
| 2005/0047989 A1 | 3/2005 | Watson |
| 2006/0060392 A1 | 3/2006 | Eyre |
| 2006/0165973 A1 | 7/2006 | Dumm et al. |
| 2007/0046119 A1 | 3/2007 | Cooley |
| 2008/0085407 A1 | 4/2008 | Cooley et al. |
| 2008/0217063 A1 | 9/2008 | Bruce et al. |
| 2008/0253706 A1 | 10/2008 | Bischof et al. |
| 2009/0020046 A1 | 1/2009 | Marcelli |
| 2009/0060408 A1 | 3/2009 | Nagasaka et al. |
| 2009/0087563 A1 | 4/2009 | Voegele et al. |
| 2009/0268995 A1 | 10/2009 | Ide et al. |
| 2010/0037864 A1 | 2/2010 | Dutt et al. |
| 2010/0061676 A1 | 3/2010 | Sugiyama et al. |
| 2010/0276200 A1 | 11/2010 | Schwefe et al. |
| 2010/0307069 A1 | 12/2010 | Bertagnolli et al. |
| 2011/0036642 A1* | 2/2011 | Eyre .................. E21B 10/5673 175/432 |
| 2011/0129327 A1* | 6/2011 | Habibvand .............. F04B 15/08 384/462 |
| 2011/0174547 A1 | 7/2011 | Sexton et al. |
| 2011/0203791 A1 | 8/2011 | Jin et al. |
| 2011/0220415 A1 | 9/2011 | Jin et al. |
| 2011/0297454 A1 | 12/2011 | Shen et al. |
| 2012/0037425 A1 | 2/2012 | Sexton et al. |
| 2012/0057814 A1 | 3/2012 | Dadson et al. |
| 2012/0225253 A1 | 9/2012 | Digiovanni et al. |
| 2012/0281938 A1 | 11/2012 | Barrett et al. |
| 2013/0000442 A1 | 1/2013 | Wiesner et al. |
| 2013/0004106 A1 | 1/2013 | Wenzel |
| 2013/0092454 A1 | 4/2013 | Scott et al. |
| 2013/0140093 A1 | 6/2013 | Zhou et al. |
| 2013/0146367 A1 | 6/2013 | Zhang et al. |
| 2013/0170778 A1 | 7/2013 | Higginbotham et al. |
| 2014/0037232 A1 | 2/2014 | Marchand et al. |
| 2014/0064646 A1 | 3/2014 | Meier et al. |
| 2014/0110180 A1* | 4/2014 | Yu .......................... E21B 10/46 175/428 |
| 2014/0169718 A1* | 6/2014 | Peterson .................. F16C 43/06 29/898.063 |
| 2014/0176139 A1 | 6/2014 | Espinosa et al. |
| 2014/0254967 A1 | 9/2014 | Gonzalez |
| 2014/0341487 A1 | 11/2014 | Cooley et al. |
| 2014/0355914 A1 | 12/2014 | Cooley et al. |
| 2015/0027713 A1 | 1/2015 | Penisson et al. |
| 2015/0079349 A1 | 3/2015 | Russell et al. |
| 2015/0132539 A1 | 5/2015 | Bailey et al. |
| 2015/0337949 A1 | 11/2015 | Ziegler et al. |
| 2016/0153243 A1 | 6/2016 | Hinz et al. |
| 2016/0186363 A1 | 6/2016 | Merzaghi et al. |
| 2016/0312535 A1 | 10/2016 | Ritchie et al. |
| 2017/0029338 A1* | 2/2017 | Scott .................... E21B 10/567 |
| 2017/0030393 A1 | 2/2017 | Phua et al. |
| 2017/0108039 A1 | 4/2017 | Hall et al. |
| 2017/0138224 A1 | 5/2017 | Henry et al. |
| 2017/0234071 A1 | 8/2017 | Spatz et al. |
| 2017/0261031 A1 | 9/2017 | Gonzalez et al. |
| 2018/0087134 A1 | 3/2018 | Chang et al. |
| 2018/0209476 A1 | 7/2018 | Gonzalez |
| 2018/0216661 A1 | 8/2018 | Gonzalez |
| 2018/0264614 A1 | 9/2018 | Winkelmann et al. |
| 2018/0320740 A1 | 11/2018 | Hall et al. |

(56) References Cited

U.S. PATENT DOCUMENTS

| | | |
|---|---|---|
| 2019/0063495 A1 | 2/2019 | Barrett et al. |
| 2019/0136628 A1 | 5/2019 | Savage et al. |
| 2019/0169935 A1 | 6/2019 | Spatz et al. |
| 2019/0170186 A1 | 6/2019 | Gonzalez et al. |
| 2019/0293115 A1* | 9/2019 | Innocenti ............ F16C 33/108 |
| 2020/0031586 A1 | 1/2020 | Miess et al. |
| 2020/0032841 A1* | 1/2020 | Miess .................... F16C 17/02 |
| 2020/0032846 A1 | 1/2020 | Miess et al. |
| 2020/0056659 A1* | 2/2020 | Prevost ................ F16C 33/043 |
| 2020/0063498 A1 | 2/2020 | Prevost et al. |
| 2020/0063503 A1 | 2/2020 | Reese et al. |
| 2020/0087991 A1 | 3/2020 | Kolste et al. |
| 2020/0182290 A1 | 6/2020 | Doehring et al. |
| 2020/0277825 A1 | 9/2020 | Panda et al. |
| 2020/0325933 A1* | 10/2020 | Prevost .................. F16C 17/03 |
| 2020/0362956 A1* | 11/2020 | Prevost .................. C22C 26/00 |
| 2020/0378440 A1* | 12/2020 | Prevost ................ F16C 33/043 |
| 2021/0131486 A1 | 5/2021 | Miess et al. |
| 2021/0140277 A1 | 5/2021 | Hall et al. |
| 2021/0148406 A1 | 5/2021 | Hoyle et al. |
| 2021/0198949 A1 | 7/2021 | Haugvaldstad et al. |
| 2021/0207437 A1 | 7/2021 | Raymond |
| 2021/0222734 A1 | 7/2021 | Gonzalez et al. |
| 2021/0293307 A1 | 9/2021 | Prevost et al. |
| 2021/0404515 A1 | 12/2021 | Prevost et al. |
| 2022/0056955 A1 | 2/2022 | Kanyanta et al. |
| 2022/0136585 A1 | 5/2022 | Prevost |
| 2023/0088047 A1 | 3/2023 | Schiermeier et al. |
| 2023/0167734 A1 | 6/2023 | Zimmerman et al. |
| 2023/0175382 A1 | 6/2023 | Chen |
| 2023/0184081 A1 | 6/2023 | Chen et al. |
| 2023/0184102 A1 | 6/2023 | Fripp et al. |
| 2023/0184985 A1 | 6/2023 | Hay et al. |

FOREIGN PATENT DOCUMENTS

| | | |
|---|---|---|
| CN | 201972618 U | 9/2011 |
| CN | 101273151 B | 12/2011 |
| CN | 102128214 B | 12/2012 |
| CN | 103069099 A | 8/2016 |
| CN | 106151029 A | 11/2016 |
| CN | 109072811 A | 12/2018 |
| CN | 209742808 U | 12/2019 |
| CN | 106678189 A | 11/2023 |
| DE | 376227 C | 5/1923 |
| DE | 4226986 A1 | 2/1994 |
| DE | 29705983 U1 | 6/1997 |
| DE | 102010052804 A1 | 5/2012 |
| EP | 0595630 B1 | 1/1998 |
| EP | 1860016 B1 | 11/2007 |
| EP | 2592295 A1 | 5/2013 |
| EP | 1931852 B1 | 1/2018 |
| EP | 3287638 A1 | 2/2018 |
| FR | 539497 A | 6/1922 |
| FR | 955966 A | 1/1950 |
| GB | 156771 A | 4/1922 |
| GB | 614917 A | 12/1948 |
| GB | 2514445 B | 6/2015 |
| JP | S401624 U | 1/1965 |
| JP | S401624 Y | 1/1965 |
| JP | S6061404 A | 4/1985 |
| JP | H06128680 A | 5/1994 |
| JP | 06174051 A | 6/1994 |
| JP | H06241232 A | 8/1994 |
| JP | H08106174 A | 4/1996 |
| JP | 2000002315 A | 1/2000 |
| JP | 2000211717 A | 8/2000 |
| JP | 2001074041 A | 3/2001 |
| JP | 2002070507 A | 3/2002 |
| JP | 2002363616 A | 12/2002 |
| JP | 2004002912 A | 1/2004 |
| JP | 2005118991 A | 5/2005 |
| JP | 2006220282 A | 8/2006 |
| JP | 2006275286 A | 10/2006 |
| JP | 2007153141 A | 6/2007 |
| JP | 2007155041 A | 6/2007 |
| JP | 2007314091 B1 | 12/2007 |
| JP | 2008056735 A | 3/2008 |
| JP | 2010174902 A | 8/2010 |
| JP | 2018141197 A | 9/2018 |
| WO | 8700080 A1 | 1/1987 |
| WO | 2004001238 A2 | 12/2003 |
| WO | 2006011028 A1 | 2/2006 |
| WO | 2006028327 A1 | 3/2006 |
| WO | 2008133197 A1 | 11/2008 |
| WO | 2011052231 A1 | 5/2011 |
| WO | 2013043917 A1 | 3/2013 |
| WO | 2014014673 A1 | 1/2014 |
| WO | 2014189763 A1 | 11/2014 |
| WO | 2016089680 A1 | 6/2016 |
| WO | 2017105883 A1 | 6/2017 |
| WO | 2018041578 A1 | 3/2018 |
| WO | 2018132915 A1 | 7/2018 |
| WO | 2018226380 A1 | 12/2018 |
| WO | 2019096851 A1 | 5/2019 |
| WO | 2020028188 A1 | 2/2020 |
| WO | 2022155204 A1 | 7/2022 |

OTHER PUBLICATIONS

Hudson Bearings Air Cargo Ball Transfers Installation and Maintenance Protocols, accessed on Jun. 23, 2018, pp. 1-5.

International Preliminary Report on Patentability mailed Oct. 24, 2024 (issued in PCT Application No. PCT/US23/65667) [7 pages].

International Search Report and Written Opinion mailed Aug. 3, 2020 (issued in PCT Application No. PCT/US20/21549) [11 pages].

International Search Report and Written Opinion mailed Aug. 4, 2020 (issued in PCT Application No. PCT/US2020/034437) [10 pages].

International Search Report and Written Opinion mailed Jan. 15, 2021 (issued in PCT Application No. PCT/US2020/049382) [18 pages].

International Search Report and Written Opinion mailed Oct. 21, 2019 (issued in PCT Application No. PCT/US2019/043746) [14 pages].

International Search Report and Written Opinion mailed Oct. 22, 2019 (issued in PCT Application No. PCT/US2019/043744) [11 pages].

International Search Report and Written Opinion mailed Oct. 25, 2019 (issued in PCT Application No. PCT/US2019/044682) [20 pages].

International Search Report and Written Opinion mailed Oct. 29, 2019 (issued in PCT Application No. PCT/US2019/043741) [15 pages].

International Search Report and Written Opinion mailed Sep. 2, 2020 (issued in PCT Application No. PCT/US20/37048) [8 pages].

International Search Report and Written Opinion mailed Sep. 8, 2020 (issued in PCT Application No. PCT/US20/35316) [9 pages].

International Search Report and Written Opinion mailed Sep. 9, 2019 (issued in PCT Application No. PCT/US2019/043732) [10 pages].

International Search Report and Written Opinion mailed Sep. 9, 2020 (issued in PCT Application No. PCT/US20/32196) [13 pages].

Linear-motion Bearing, Wikipedia, https://en.wikipedia.org/w/index.php?title=Linear-motion_bearing&oldid=933640111, Jan. 2, 2020, 4 Pages.

Anonymous: "Chemical vapor deposition—Wikipedia", Dec. 27, 2023, Retrieved from the Internet on Feb. 9, 2024, https://en.wikipedia.org/wiki/Chemical_vapor_deposition#Diamond (14 pages).

Anonymous: "CVD Diamond—FAQ", Feb. 8, 2024, Retrieved from the Internet on Feb. 9, 2024, http://www.cvd-diamond.com/faq_en.htm (4 pages).

Anonymous: "Diamond-like carbon—Wikipedia", Jan. 9, 2024, Retrieved from the Internet on Feb. 9, 2024, https://en.wikipedia.org/wiki/Diamond-like_carbon (10 pages).

Bovenkerk, Dr. H. P.; Bundy, Dr. F. P.; Hall, Dr. H. T.; Strong, Dr. H. M.; Wentorf, Jun., Dr. R. H.; Preparation of Diamond, Nature, Oct. 10, 1959, pp. 1094-1098, vol. 184.

(56) References Cited

OTHER PUBLICATIONS

British Stainless Steel Association. Selection of Stainless Steels for Cryogenic Applications. Accessed on Apr. 6, 2022 [1 page].
Chen, Y.; Nguyen, T; Zhang, L.C.; Polishing of polycrystalline diamond by the technique of dynamic friction—Part 5: Quantitative analysis of material removal, International Journal of Machine Tools & Manufacture, 2009, pp. 515-520, vol. 49, Elsevier.
Chen, Y.; Zhang, L.C.; Arsecularatne, J.A.; Montross, C.; Polishing of polycrystalline diamond by the technique of dynamic friction, part 1: Prediction of the interface temperature rise, International Journal of Machine Tools & Manufacture, 2006, pp. 580-587, vol. 46, Elsevier.
Chen, Y.; Zhang, L.C.; Arsecularatne, J.A.; Polishing of polycrystalline diamond by the technique of dynamic friction. Part 2: Material removal mechanism, International Journal of Machine Tools & Manufacture, 2007, pp. 1615-1624, vol. 47, Elsevier.
Chen, Y.; Zhang, L.C.; Arsecularatne, J.A.; Zarudi, I., Polishing of polycrystalline diamond by the technique of dynamic friction, part 3: Mechanism exploration through debris analysis, International Journal of Machine Tools & Manufacture, 2007, pp. 2282-2289, vol. 47, Elsevier.
Chen, Y.; Zhang, L.C.; Polishing of polycrystalline diamond by the technique of dynamic friction, part 4: Establishing the polishing map, International Journal of Machine Tools & Manufacture, 2009, pp. 309-314, vol. 49, Elsevier.
Dobrzhinetskaya, Larissa F.; GREEN, II, Harry W.; Diamond Synthesis from Graphite in the Presence of Water and SiO2: Implications for Diamond Formation in Quartzites from Kazakhstan, International Geology Review, 2007, pp. 389-400, vol. 49.
Element six, The Element Six CVD Diamond Handbook, Accessed on Nov. 1, 2019, 28 pages.
Gasparini (Jan. 14, 2019). Metals and Materials for Low Temperatures and Cryogenic Applications. Accessed on Apr. 6, 2022. [13 pages].
Grossman, David, What the World Needs Now is Superhard Carbon, Popular Mechanics, https://www.popularmechanics.com/science/environment/a28970718/superhard-materials/,Sep. 10, 2019, 7 pages, Hearst Magazine Media, Inc.
H.G. Gibson (Dec. 2019). Design Guide for Bearings Used in Cryogenic Turbopumps and Test Rigs. Marshall Space Flight Center. [44 pages].
Leo W. Winn, et al (1974). Small, High-Speed Bearing Technology for Cryogenic Turbo-Pumps. Prepared for National Aeronautics and Space Administration. [229 pages].
Liao, Y.; Marks, L.; In situ single asperity wear at the nanometre scale, International Materials Reviews, 2016, pp. 1-17, Taylor & Francis.
Linear Rolling Bearings ME EN 7960—Precision Machine Design Topic 8, Presentation, Accessed on Jan. 26, 2020, 23 Pages, University of Utah.
Louyang Monton Bearing Science & Technology Co. Ltd. Catalogue. Accessed on Apr. 6, 2022. [7 pages].
Machinery's Handbook 30th Edition, Copyright p. and Coefficients of Friction Page, 2016, p. 158 (2 pages total), Industrial Press, Inc., South Norwalk, U.S.A.
Machinery's Handbook, 2016, Industrial Press, Inc., 30th edition, pp. 843 and 1055 (6 pages total).
McCarthy, J. Michael; Cam and Follower Systems, PowerPoint Presentation, Jul. 25, 2009, pp. 1-14, UCIrvine The Henry Samueli School of Engineering.
McGill Cam Follower Bearings brochure, 2005, p. 1-19, Back Page, Brochure MCCF-05, Form #8991 (20 Pages total).
Motion & Control NSK Cam Followers (Stud Type Track Rollers) Roller Followers (Yoke Type Track Rollers) catalog, 1991, Cover Page, pp. 1-18, Back Page, CAT. No. E1421 2004 C-11, Japan.
Product Catalogue, Asahi Diamond Industrial Australia Pty. Ltd., accessed on Jun. 23, 2018, Cover Page, Blank Page, 2 Notes Pages, Table of Contents, pp. 1-49 (54 Pages total).
RBC Aerospace Bearings Rolling Element Bearings catalog, 2008, Cover Page, First Page, pp. 1-149, Back Page (152 Pages total).
RGPBalls Ball Transfer Units catalog, accessed on Jun. 23, 2018, pp. 1-26, 2 Back Pages (28 Pages total).
Sandvik Coromant Hard part turning with CBN catalog, 2012, pp. 1-42, 2 Back Pages (44 Pages total).
Sexton, Timothy N.; Cooley, Craig H.; Diamond Bearing Technology for Deep and Geothermal Drilling, PowerPoint Presentation, 2010, 16 Pages.
SKF Ball transfer units catalog, Dec. 2006, Cover Page, Table of Contents, pp. 1-36, 2 Back Pages (40 Pages total), Publication 940-711.
Sowers, Jason Michael, Examination of the Material Removal Rate in Lapping Polycrystalline Diamond Compacts, A Thesis, Aug. 2011, 2 Cover Pages, pp. iii-xiv, pp. 1-87 (101 Pages total).
Sun, Liling; Wu, Qi; Dai, Daoyang; Zhang, Jun; Qin, Zhicheng; Wang, Wenkui; Non-metallic catalysts for diamond synthesis under high pressure and high temperature, Science in China (Series A), Aug. 1999, pp. 834-841, vol. 42 No. 8, China.
Superhard Material, Wikipedia, https://en.wikipedia.org/wiki/Superhard_material, Retrieved from https://en.wikipedia.org/w/index.php?title=Superhard_material&oldid=928571597, Nov. 30, 2019, 14 pages.
Surface Finish, Wikipedia, https://en.wikipedia.org/wiki/Surface_finish, Retrieved from https://en.wikipedia.org/w/index.php?title=Surface_finish&oldid=919232937, Oct. 2, 2019, 3 pages.
Tungsten Carbide Properties. Accessed on Apr. 6, 2022. [2 pages].
United States Defensive Publication No. T102,901, published Apr. 5, 1983, in U.S. Application No. 298,271 [2 Pages].
USSynthetic Bearings and Waukesha Bearings brochure for Diamond Tilting Pad Thrust Bearings, 2015, 2 Pages.
USSynthetic Bearings brochure, accessed on Jun. 23, 2018, 12 Pages, Orem, Utah.
Xu, J., Li, C., Miao, X. et al. An Overview of Bearing Candidates for the Next Generation of Reusable Liquid Rocket Turbopumps. Chinese Journal Mechanical Engineering. 33, 26 (2020). https://doi.org/10.1186/s10033-020-00442-6. Accessed on Apr. 6, 2022. [13 pages].
Zeidan, Fouad Y.; Paquette, Donald J., Application of High Speed and High Performance Fluid Film Bearings in Rotating Machinery, 1994, pp. 209-234.
Zhigadlo, N. D., Spontaneous growth of diamond from MnNi solvent-catalyst using opposed anvil-type high-pressure apparatus, accessed on Jun. 28, 2018, pp. 1-12, Laboratory for Solid State Physics, Switzerland.
Zou, Lai; Huang, Yun; Zhou, Ming; Xiao, Guijian; Thermochemical Wear of Single Crystal Diamond Catalyzed by Ferrous Materials at Elevated Temperature, Crystals, 2017, pp. 1-10, vol. 7.
International Search Report and Written Opinion received in PCT Application No. PCT/US23/65667 mailed Jul. 31, 2023 [8 pages].
International Search Report and Written Opinion received in PCT Application No. PCT/US2022/012127 mailed Apr. 4, 2022 [12 pages].
Wang Xiyong, Zhang Yihan, and Xiong Jiyou; "Study of PDC bit's optimization matching with dynamical drilling tools and PDC bit drilling performance", 2005 Vol. 34 Oilfield Machinery; No. 1, p. 27 Oil Field Equipment 2005, 34(1): 27-29; 1994-2007 China Academic Journal Electronic Publishing House (3 pages).

* cited by examiner

POLYCRYSTALLINE DIAMOND-ON-METAL BEARINGS FOR USE IN CRYOGENIC CONDITIONS

CROSS-REFERENCE TO RELATED APPLICATIONS

The present application claims the benefit of U.S. Provisional Patent Application No. 63/330,619, filed on Apr. 13, 2022, and entitled "Polycrystalline Diamond Bearings for Use in Low Temperature and Cryogenic Conditions," the entirety of which is incorporated herein by reference.

FIELD

The present disclosure relates to bearings that include polycrystalline diamond bearing surfaces engaged with metal bearing surfaces for use in low-temperature conditions including cryogenic conditions, to systems including the same, to methods of making the same, and to methods of using the same.

BACKGROUND

Bearings are employed in myriad applications including, but not limited to aircraft, aerospace, rockets, transportation, defense, agriculture, mining, construction, and energy (e.g., oil and gas drilling, completion and production equipment). Bearings can have many different configurations, such as radial bearings, axial bearings (e.g., thrust bearings), combination radial and axial bearings, linear bearings, power transmission surface bearings, roller bearings, and cam and cam follower assemblies.

In some applications, bearings are subjected to relatively low-temperatures, such as in cryogenic conditions. Such low-temperature applications present challenges to the functionality and structural integrity of bearings. Certain materials that are ductile at room temperature, abruptly lose ductility below a given temperature threshold. Some common construction steels, ferritic or martensitic stainless steels, iron, chromium, and tungsten, can become brittle at relatively low temperatures.

Also, certain lubricants, such as hydrocarbon-type lubricants, can thicken and/or degrade in such low-temperature environments, such that the ability of the lubricant to properly lubricate the bearing is reduced or eliminated. In roller bearing assemblies, low-temperature conditions, such as where a cryogenic fuel is used as the lubricant, the roller bearings can exhibit undesirably high-startup friction and high-point loading.

Additionally, polycrystalline diamond bearing elements that are in sliding contact with certain metals, including at cryogenic environmental temperatures, have a potential for relatively high localized temperatures (relative to the low-temperature of the surrounding environment) that can lead to graphitization of the diamond material.

When diamond elements are used in moving parts, typically both the engagement surface and the opposing engagement surface of the bearing assembly are composed of polycrystalline diamond. This is, at least in part, because polycrystalline diamond, including thermally stable polycrystalline diamond (TSP), either supported or unsupported by tungsten carbide, and polycrystalline diamond compact (PDC) have been considered as contraindicated for use in the machining of diamond reactive materials. At certain surface speeds in moving parts, load and attendant temperature generated, such as at a cutting tip, often exceeds the graphitization temperature of diamond (i.e., about 700° C.), which can, in the presence of a diamond reactive material, lead to rapid wear and failure of components. Without being bound by theory, the specific failure mechanism is believed to result from the chemical interaction of the carbon bearing diamond with the carbon attracting material that is being machined. An exemplary reference concerning the contraindication of diamond for diamond reactive material machining is U.S. Pat. No. 3,745,623. The contraindication of diamond for machining diamond reactive material has long caused the avoidance of the use of diamond in all contacting applications with such materials.

BRIEF SUMMARY

Some embodiments of the present disclosure include a bearing assembly for use in low-temperature conditions. The bearing assembly includes a polycrystalline diamond bearing element having a diamond bearing surface. The bearing assembly includes an opposing bearing element having a metal bearing surface. The metal bearing surface includes a metal that contains at least 2 weight percent of a diamond solvent-catalyst based on a total weight of the metal. The metal is ductile at a temperature of −150° C. or lower. The metal bearing surface is in contact with the diamond bearing surface.

Some embodiments of the present disclosure include a system for use in low-temperature conditions. The system includes a bearing assembly including a polycrystalline diamond bearing element and an opposing bearing element. The polycrystalline diamond bearing element has a diamond bearing surface. The opposing bearing element has a metal bearing surface that includes a metal. The metal contains at least 2 weight percent of a diamond solvent-catalyst based on a total weight of the metal. The metal is ductile at a temperature of −150° C. or lower. The metal bearing surface is in contact with the diamond bearing surface.

Some embodiments of the present disclosure include a method of making bearings for cryogenic applications. The method includes providing a polycrystalline diamond element having a diamond bearing surface. The method includes providing an opposing bearing element having a metal bearing surface that includes a metal. The metal retains ductility at a temperature of −150° C. or lower, and the metal contains at least 2 weight percent of a diamond solvent-catalyst based on a total weight of the metal. The method includes forming a bearing assembly, including coupling the polycrystalline diamond element with the opposing bearing element such that the metal bearing surface is in contact with the diamond bearing surface.

Some embodiments of the present disclosure include a method of using a bearing in cryogenic applications. The method includes providing a bearing assembly that includes a polycrystalline diamond element and an opposing bearing element. The polycrystalline diamond element has a diamond bearing surface. The opposing bearing element has a metal bearing surface that includes a metal containing at least 2 weight percent of a diamond solvent-catalyst based on a total weight of the metal. The polycrystalline diamond element is coupled with the opposing bearing element such that the metal bearing surface is in contact with the diamond bearing surface. The method includes operating the bearing assembly at an operating temperature that is within a temperature range of from −150° C. to −253° C. The metal retains ductility at the operating temperature.

BRIEF DESCRIPTION OF THE DRAWINGS

So that the manner in which the features and advantages of the assemblies, systems, and methods of the present disclosure may be understood in more detail, a more particular description briefly summarized above may be had by reference to the embodiments thereof which are illustrated in the appended drawings that form a part of this specification. It is to be noted, however, that the drawings illustrate only various exemplary embodiments and are therefore not to be considered limiting of the disclosed concepts as it may include other effective embodiments as well.

DETAILED DESCRIPTION

Figure 1A:
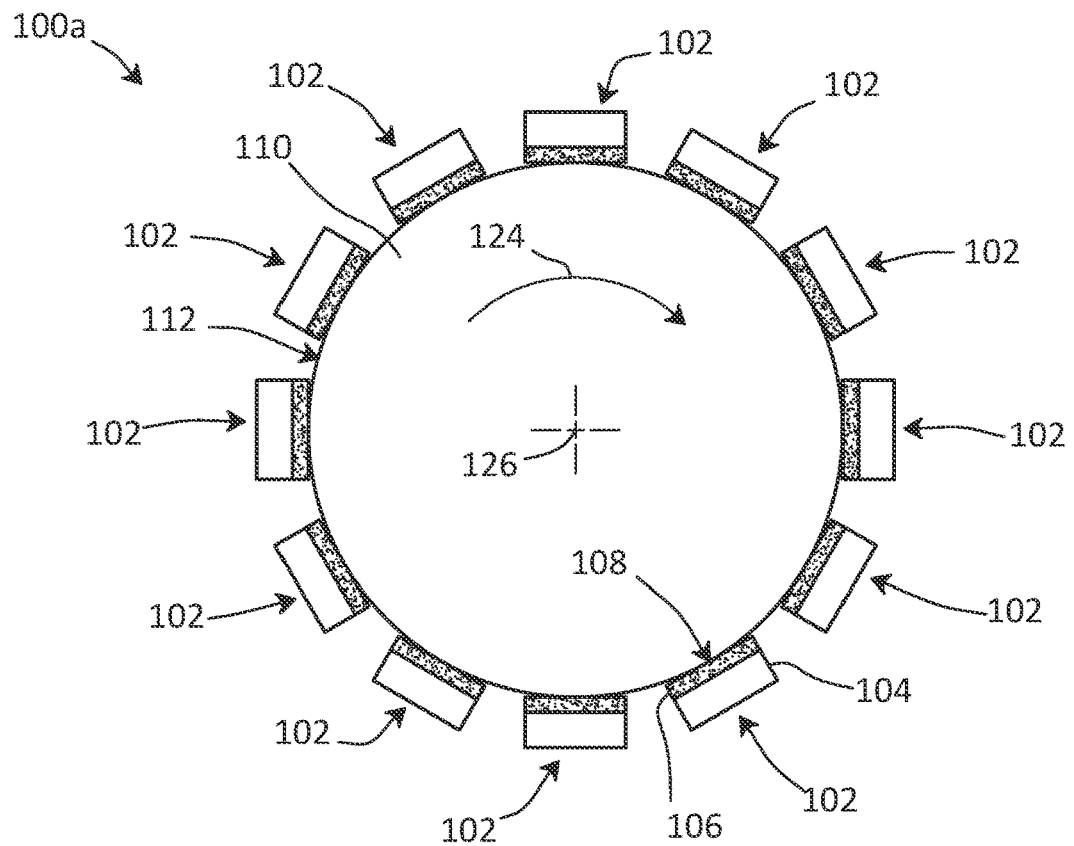
FIG. 1A is a perspective view of a bearing assembly that includes multiple polycrystalline bearing elements in sliding contact with a metal bearing surface.

Certain embodiments of the present disclosure include bearings for use in low-temperature conditions, including cryogenic conditions, such as for aerospace applications. The bearings disclosed herein include polycrystalline diamond bearing elements having diamond bearing surfaces and opposing bearing elements having metal bearing surfaces. In operation, the diamond bearing surfaces are in contact (e.g., sliding contact), under load, with the metal bearing surfaces.

Low-Temperature Conditions

In embodiments disclosed herein, both the polycrystalline diamond bearing elements and the opposing bearing elements are materials configured to withstand low-temperatures and to operate as bearings in low-temperature conditions. The metal can remain sufficiently ductile at low-temperatures such that the opposing bearing element does not become brittle at the low-temperatures, including during operation of the bearing. The bearings disclosed herein can operate in the low-temperature conditions without the occurrence of brittle fracture in the bearing elements.

The low-temperature conditions disclosed herein include cryogenic temperature conditions. For example, the bearings disclosed herein can operate at temperatures ranging from −150° C. to −253° C. (e.g., the temperature of liquid hydrogen), or from −195° C. to −225° C., or any range or discrete value therebetween. In some embodiments, the bearings disclosed herein can operate at temperatures of −150° C. or lower, or −195° C. or lower, or −225° C. or lower. The bearings disclosed herein may operate at temperatures at which hydrogen, methane, natural gas, oxygen, nitrogen, or helium are in a liquid state.

Diamond Bearing Surfaces

The bearing assemblies disclosed herein include a polycrystalline diamond bearing element having a polycrystalline diamond engagement surface (also referred to as a polycrystalline diamond bearing surface) engaged with an opposing bearing element having an opposing metal engagement surface (also referred to as an opposing bearing surface). The polycrystalline diamond (PCD) may be or include TSP diamond, either supported or unsupported by a support, such as a tungsten carbide support. The polycrystalline diamond may be or include a PDC. In certain applications, the polycrystalline diamond disclosed herein has increased cobalt content transitions layers between an outer polycrystalline diamond surface and a supporting tungsten carbide slug. The polycrystalline diamond may be non-leached, leached, leached and backfilled, thermally stable, or coated with a material, such as via chemical vapor deposition (CVD). In some embodiments, the polycrystalline diamond is formed via a CVD process. Throughout the descriptions of the embodiments in this disclosure, for the sake of brevity and simplicity, "diamond" is used to refer to "polycrystalline diamond." That is, the "diamond bearing surfaces" disclosed herein are "polycrystalline diamond bearing surfaces" and the "diamond bearing elements" are "polycrystalline diamond bearing elements."

In some embodiments, the bearing assemblies disclosed herein include only a single polycrystalline diamond bearing element. In other embodiments, the bearing assemblies disclosed herein include a plurality of discrete polycrystalline diamond bearing elements. The plurality of discrete polycrystalline diamond bearing elements can be arranged in a spaced-apart configuration in the bearing assembly.

In certain applications, the diamond, or at least the engagement surface thereof, is lapped or polished, optionally highly lapped or highly polished. As used herein, a surface is defined as "highly lapped" if the surface has a surface roughness of about 20 µin Ra, such as a surface roughness ranging from about 18 to about 22 µin Ra. As used herein, a surface is defined as "polished" if the surface has a surface roughness of from about 2 to about 10 µRa. As used herein, a surface is defined as "highly polished" if the surface has a surface roughness of less than 2 µin Ra, such as a surface roughness of from about 0.5 µin to less than about 2 µin Ra.

In some aspects, the diamond bearing surfaces disclosed herein have a surface roughness ranging from 0.5 µin Ra to 20 µin Ra, or from 2 µin Ra to 18 µin Ra, or from 5 µin Ra to 15 µin Ra, or from 8 µin Ra to 12 µin Ra, or less than 20 µin Ra, or less than 18 µin Ra, or less than 10 µin Ra, or less than 2 µin Ra, or any range or discrete value therebetween. Without being bound by theory, it is believed that diamond that has been polished to a surface roughness of 0.5 µin Ra has a coefficient of friction that is less than (e.g., about half or more than half) of standard lapped diamond that has a surface roughness of 20-40 µin Ra. As would be understood by one skilled in the art, surface finish, also referred to as surface texture or surface topography, is a characteristic of a surface as defined by lay, surface roughness, and waviness. As would be understood by one skilled in the art, the surface roughness Ra is a "roughness average." Surface finish may be determined in accordance with ASME B46.1-2019. Surface finish or roughness may be measured with a profilometer, laser microscope, or with Atomic Force Microscopy, for example.

Metal Bearing Surface

The opposing bearing element includes a metal bearing surface. The metal bearing surface includes a metal that is a diamond reactive material. As used herein, a metal that is a "diamond reactive material" is a metal that contains more than trace amounts of diamond solvent-catalyst (also referred to as a diamond catalyst-solvent, diamond solvent, or diamond catalyst). As used herein, a metal that contains more than "trace amounts" of diamond solvent-catalyst is a metal that contains at least 2 percent by weight (wt. %) diamond solvent-catalyst based on a total weight of the metal. Some examples of known diamond solvent-catalysts are disclosed in: U.S. Pat. Nos. 6,655,845; 3,745,623; 7,198,043; 8,627,904; 5,385,715; 8,485,284; 6,814,775; 5,271,749; 5,948,541; 4,906,528; 7,737,377; 5,011,515; 3,650,714; 2,947,609; 8,764,295. As would be understood by one skilled in the art, diamond solvent-catalysts are chemical elements, compounds, or materials (e.g., metals) that are capable of catalyzing the formation of diamond, such as by promoting intercrystallite diamond-to-diamond bonding between diamond grains to form a polycrystalline diamond. As would be understood by one skilled in the art, diamond solvent-catalysts are chemical elements, compounds, or materials (e.g., metals) that are capable of solubilizing polycrystalline diamond by catalyzing the reaction of the diamond into graphite, such as under load and at a temperature at or exceeding the graphitization temperature of diamond. Diamond solvent-catalysts are capable of catalyzing the graphitization of diamond (e.g., polycrystalline diamond), such as when under load and at a temperature at or exceeding the graphitization temperature of the diamond (e.g., about 700° C.). Diamond reactive materials include, but are not limited to, metals including metal alloys that contain more than trace amounts of diamond solvent-catalysts. Some exemplary diamond solvent-catalysts include iron, cobalt, nickel, ruthenium, rhodium, palladium, chromium, manganese, copper, titanium, and tantalum. Thus, a diamond reactive material can be a metal that includes more than trace amounts of iron, cobalt, nickel, ruthenium, rhodium, palladium, chromium, manganese, copper, titanium, and tantalum, or combinations thereof. One exemplary diamond reactive material is steel.

The diamond reactive material disclosed herein may be a metal or metal alloy (collectively referred to herein as a "metal" or a "metallic material") having a metal surface. As would be understood by one skilled in the art, metals include materials that contain metal atoms that are typically characterized by metallic bonding between the metal atoms. That is, metals can be characterized as having metal atoms that are chemically bonded together, with at least predominantly metallic bonding between the metal atoms (e.g., in a crystalline structure of the metal atoms). The metals disclosed herein are not ceramics (e.g., carbides, oxides, nitrides, natural diamond), plastics, or composites (e.g., ceramic matrix composites or metal matrix composites, such as cermets, cemented carbide cobalt composites, PCD cobalt binder composites, CBN cobalt binder composites). In some embodiments the metal is a metal alloy. In other embodiments the metal is not a metal alloy (i.e., contains a single metal). The metal may be ferrous or a ferrous alloy. For example, the metal may be iron or an iron alloy, such as cast iron or steel, such as stainless steel, carbon steel, tool steel, or alloy steels. The metal may be non-ferrous or a non-ferrous alloy. For example, the metal may be nickel or a nickel alloy, cobalt or a cobalt alloy, copper or a copper alloy, titanium or a titanium alloy, ruthenium or a ruthenium alloy, rhodium or a rhodium alloy, palladium or a palladium alloy, chrome or a chrome alloy, manganese or a manganese alloy, or tantalum or a tantalum alloy.

The metal bearing surfaces for use in the low-temperature conditions disclosed herein include metals that are ductile at the low-temperatures disclosed herein, and that remain ductile during operation of the bearings in the low-temperature conditions, including cryogenic temperatures. For example, the metals include metals that are ductile within a temperature range of from 0° C. to −253° C., or from −150° C. to −253° C., or from −195° C. to −225° C., or any range or discrete value therebetween. In some embodiments, the metals include metals that are ductile at a temperature of 0° C. or lower, or −150° C. or lower, or −195° C. or lower, or −225° C. or lower, or −253° C. or lower. The metals include metals that have a ductile-to-brittle transition temperature (DBTT) that is lower than 0° C., or lower than −50° C., or lower than −100° C., or lower than −150° C., or lower than −195° C., or lower than −225° C., or lower than −253° C. As would be understood by one skilled in the art, the DBTT of a metal is the temperature (or temperature range) above which the metal is ductile and below which the metal is brittle.

Some metals exhibit a DBTT over a certain temperature range within which the metal exhibits a pronounced reduction in the impact toughness over a small decrease in temperature. When plotted on a graph, the energy absorbed against temperature of such metals can produce an 'S' curve, with the mid-point on the 'S' is being the transition temperature for that metal. The transition temperature is the temperature where the fracture failure mode of the metal changes from ductile to brittle. In some embodiments, the metal of the metal bearing surface disclosed herein does not exhibit such an impact DBTT, but exhibits a progressive reduction in Charpy impact values as the temperature is progressively lowered.

The Charpy impact test can be used to assess the suitability of the metal use in cryogenic conditions. For example, the metal can be cooled to a desired temperature, such as the expected operating temperature (e.g., cryogenic conditions) and then subjected to the Charpy impact test at the desired temperatures. As would be understood by one skilled in the art, the Charpy impact test measures energy absorbed, in Joules, when a standard 10 mm square test piece, typically with a 2 mm deep 'v' notch, is fractured by striking the test piece in a pendulum-type testing machine. The Charpy impact test can be performed in accordance with ASTM-E23-18. In some embodiments, the metals of the metal bearing surface do not fracture when tested in accordance with the Charpy impact test at the cryogenic conditions disclosed herein. As used herein, when a metal is described as being or remaining "ductile" under certain conditions, that metal does not exhibit brittle fracture under those conditions (e.g., when subjected to a Charpy impact test under those conditions or when operated as a bearing surface under those conditions).

The metal of the metal bearing surface can be a cryogenic steel. One exemplary metal for use herein is an alloy steel that contains 9 wt. % nickel, and that can operate as a bearing surface at temperatures as low as −195° C. For example, at least some alloy steels that are typically used for the transport and storage of cryogenic materials may be used as the metal of the metal bearing surface disclosed herein. Some such alloy steels are relatively easy to use in the fabrication of bearing elements. For some cryogenic applications, steels containing 3.5 wt. % or 5 wt. % nickel may be applicable. Table 1, below, shows some exemplary metal alloys that may be suitable for certain cryogenic applications.

TABLE 1

Exemplary Metals

| Steels | Nickel Alloys | Titanium Alloys |
|---|---|---|
| Quenched and tempered 9% Ni | Monel | Heat treated 6Al—4V—Ti |
| Steel A286 | TD Nickel | Heat treated 8Al—2Cb—1Ta—Ti |
| Maraging steels 301 | Hastelloy B | Annealed 6Al—4V—Ti ELI |
| Maraging steels 302 | Inconel X | 5Al—2.5Sn—TiELi |
| 304ELC | Inconel 718 | Ti45A(AMS 4902) |
| 310 Low-C Stainless Steel Casting Alloys | René 41 | — |

The opposing bearing surface may include a metal that contains at least 2 wt. % of a diamond solvent-catalyst based on a total weight of the metal. In some embodiments, the opposing bearing surface is or includes a metal that contains from 2 to 100 wt. %, or from 5 to 95 wt. %, or from 10 to 90 wt. %, or from 15 to 85 wt. %, or from 20 to 80 wt. %, or from 25 to 75 wt. %, or from 25 to 70 wt. %, or from 30 to 65 wt. %, or from 35 to 60 wt. %, or from 40 to 55 wt. %, or from 45 to 50 wt. % of diamond solvent-catalyst based on a total weight of the metal, or any range or discrete value therebetween. In some embodiments, the opposing bearing surface is or includes a metal that contains at least 3 wt. %, or at least 5 wt. %, or at least 10 wt. %, or at least 15 wt. %, or at least 20 wt. %, or at least 25 wt. %, or at least 30 wt. %, or at least 35 wt. %, or at least 40 wt. %, or at least 45 wt. %, or at least 50 wt. %, or at least 55 wt. %, or at least 60 wt. %, or at least 65 wt. %, or at least 70 wt. %, or at least 75 wt. %, or at least 80 wt. %, or at least 85 wt. %, or at least 90 wt. %, or at least 95 wt. %, or at least 99 wt. %, or 100 wt. % of diamond solvent-catalyst based on a total weight of the metal. In some embodiments, an entirety of the opposing bearing surface is a diamond reactive material.

In some embodiments, the diamond reactive materials disclosed herein contain from 2 to 100 wt. %, or from 5 to 95 wt. %, or from 10 to 90 wt. %, or from 15 to 85 wt. %, or from 20 to 80 wt. %, or from 25 to 75 wt. %, or from 25 to 70 wt. %, or from 30 to 65 wt. %, or from 35 to 60 wt. %, or from 40 to 55 wt. %, or from 45 to 50 wt. % of metal based on a total weight of the diamond reactive material, or any discrete value or range therebetween. In some embodiments, the diamond reactive materials disclosed herein contain at least 3 wt. %, or at least 5 wt. %, or at least 10 wt. %, or at least 15 wt. %, or at least 20 wt. %, or at least 25 wt. %, or at least 30 wt. %, or at least 35 wt. %, or at least 40 wt. %, or at least 45 wt. %, or at least 50 wt. %, or at least 55 wt. %, or at least 60 wt. %, or at least 65 wt. %, or at least 70 wt. %, or at least 75 wt. %, or at least 80 wt. %, or at least 85 wt. %, or at least 90 wt. %, or at least 95 wt. %, or at least 99 wt. %, or 100 wt. % of metal based on a total weight of the diamond reactive material.

In some embodiments, the diamond reactive materials disclosed herein contain from 2 to 100 wt. %, or from 5 to 95 wt. %, or from 10 to 90 wt. %, or from 15 to 85 wt. %, or from 20 to 80 wt. %, or from 25 to 75 wt. %, or from 25 to 70 wt. %, or from 30 to 65 wt. %, or from 35 to 60 wt. %, or from 40 to 55 wt. %, or from 45 to 50 wt. % of diamond solvent-catalyst based on a total weight of the diamond reactive material, or any discrete value or range therebetween. In some embodiments, the diamond reactive materials disclosed herein contain at least 3 wt. %, or at least 5 wt. %, or at least 10 wt. %, or at least 15 wt. %, or at least 20 wt. %, or at least 25 wt. %, or at least 30 wt. %, or at least 35 wt. %, or at least 40 wt. %, or at least 45 wt. %, or at least 50 wt. %, or at least 55 wt. %, or at least 60 wt. %, or at least 65 wt. %, or at least 70 wt. %, or at least 75 wt. %, or at least 80 wt. %, or at least 85 wt. %, or at least 90 wt. %, or at least 95 wt. %, or at least 99 wt. %, or 100 wt. % of diamond solvent-catalyst based on a total weight of the diamond reactive material.

In some embodiments, less than an entirety of the opposing bearing surface includes the diamond reactive material, with the provision that a metal contact area of the opposing bearing surface includes diamond reactive material in at least one position along a contact path between the metal contact area and a diamond contact area of the bearing surface. For example, the opposing bearing surface may include a section of diamond reactive material adjacent a section of another material that is not a diamond reactive material.

In some embodiments, the diamond reactive material is a superalloy including, but not limited to, an iron-based superalloy, a cobalt-based superalloy, or a nickel-based superalloy.

In certain embodiments, the diamond reactive material is not and/or does not include (i.e., specifically excludes) so called "superhard materials." As would be understood by one skilled in the art, "superhard materials" are a category of materials defined by the hardness of the material, which may be determined in accordance with the Brinell, Rockwell, Knoop and/or Vickers scales. Superhard materials are materials with a hardness value exceeding 40 gigapascals (GPa) when measured by the Vickers hardness test. The diamond reactive materials disclosed herein may be softer than a superhard material. For example, the diamond reactive materials disclosed herein may have a hardness value of less than 40 GPa, or less than 35 GPa, or less than 30 GPa, or less than 25 GPa, or less than 20 GPa, or less than 15 GPa, or less than 10 GPa, or less than 8 GPa, or less than 6 GPa, or less than 5 GPa, or less than 4 GPa, or less than 3 GPa, or less than 2 GPa, or less than 1 GPa when measured by the Vickers hardness test. The diamond reactive materials disclosed herein are softer than tungsten carbide (WC), which has a hardness of about 25 GPa. The diamond reactive materials disclosed herein include materials that are softer than tungsten carbide tiles, cemented tungsten carbide, and infiltrated tungsten carbide. The diamond reactive materials disclosed herein include materials that are softer than silicon carbide, silicon nitride, cubic boron nitride, and polycrystalline diamond. One skilled in the art would understand that hardness may be determined by different tests, including a Brinell scale test in accordance with ASTM E10-18; the Vickers hardness test in accordance with ASTM E92-17; the Rockwell hardness test in accordance with ASTM E18; and the Knoop hardness test in accordance with ASTM E384-17.

In some embodiments, the diamond reactive materials are in the form of hardfacings, coatings, or platings on another material, such that the diamond reactive material forms the opposing bearing surface. In such embodiments, the hardfacing, coating, or plating includes the diamond reactive material. In some such embodiment, the material underlying the hardfacing, coating, or plating is not a diamond reactive material. In other such embodiments, the material underlying the hardfacing, coating, or plating is a diamond reactive material (the same or different than the overlying hardfacing, coating, or plating).

In some embodiments, the opposing bearing surface has carbon applied thereto. In some such embodiments, the carbon is applied to the opposing bearing surface prior to engagement with the diamond bearing surface. For example, the opposing bearing surface may be saturated with carbon. Without being bound by theory, it is believed that such application of carbon reduces the ability of the diamond solvent-catalyst in the opposing bearing surface to attract carbon through graphitization of the surface of the polycrystalline diamond element. That is, the carbon that is applied to the opposing bearing surface functions as a sacrificial layer of carbon. In such embodiments, the opposing bearing surface that underlies the carbon includes the diamond reactive material.

In some embodiments, the opposing bearing surface is a treated surface in accordance with the treatments disclosed in U.S. Pat. No. 11,035,407. For example, the opposing bearing surface (also referred to as the opposing engagement surface) may be hardened, such as via cold working and work hardening processes including burnishing and shot peening; and/or heat-treating processes including through hardening, case hardening, and subzero, cryogenic, deep-freezing treatments. Also, the opposing bearing surface may be plated and/or coated, such as via electroplating, electroless plating, including chromium plating, phosphating, vapor deposition, including physical vapor deposition (PVD) and CVD; or anodizing. Also, the opposing bearing surface may be cladded, such as via roll bonding, laser cladding, or explosive welding.

In some embodiments, the opposing bearing surface has a surface roughness of from 0.5 to 2,000 µin Ra, or from 1 to 1,900 µin Ra, or from 5 to 1,500 µin Ra, or from 10 to 1,200 µin Ra, or from 50 to 1,000 µin Ra, or from 100 to 800 µin Ra, or from 200 to 600 µin Ra. In some embodiments, the opposing bearing surface has a surface roughness that is equal to, less than, or greater than the diamond bearing surface.

Engaged Bearing Surfaces

In some embodiments, the present disclosure provides for interfacing contact between the diamond bearing surface and the metal bearing surface within a bearing assembly. Interfacing contact between the bearing surfaces includes engaging the diamond bearing surface in contact (e.g., sliding contact) with the opposing bearing surface. As used herein, "engagement surface" or "bearing surface" refers to the surface of a material or component (e.g., the surface of polycrystalline diamond or the surface of a diamond reactive material) that is positioned and arranged within a bearing assembly such that, in operation of the bearing assembly, the "engagement surface" or "bearing surface" is positioned and/or available to interface the contact between two components to bear load (e.g., radial and/or axial load). In some embodiments, the diamond bearing surface disclosed herein is in direct contact with the opposing metal bearing surface without a fluid film therebetween (i.e., boundary lubrication). In other embodiments, a fluid film is positioned and/or develops between the diamond bearing surface and the opposing metal bearing surface such that the bearing surfaces are not directly in contact with one another, but are engaged through the fluid film (i.e., hydrodynamic lubrication). The contact between the diamond bearing surface and opposing metal bearing surface may be between (or a mixture of) or may vary between direct contact and fluid film (i.e., mixed boundary lubrication).

Bearing Assemblies

The bearing assemblies disclosed herein can be axial (thrust) bearing assemblies such as those disclosed in U.S. Pat. No. 10,760,615; radial bearing assemblies such as those disclosed in U.S. Pat. No. 10,738,821; combined axial and radial bearing assemblies; cam and cam follower assemblies such as those disclosed in U.S. Pat. No. 10,465,775; roller ball bearings such as those disclosed in U.S. Pat. No. 11,014,759; linear bearings such as those disclosed in U.S. Pat. No. 11,371,556; power transfer surfaces such as those disclosed in U.S. Pat. No. 11,054,000; tubular protections such as those disclosed in U.S. Pat. No. 11,225,842 and U.S. Patent Publication No. 2022/178214; drilling motor bearings such as those disclosed in U.S. Pat. No. 11,187,040; driveline bearings such as those disclosed in U.S. Patent Publication No. 2022/0136585 and U.S. Patent Publication No. 2022/0243788, continuous bearings such as those disclosed in U.S. Patent Publication No. 2022/0145933; or discontinuous bearings or valves such as those disclosed in U.S. Patent Publication No. 2022/0145934. The bearings disclosed herein may exhibit compliance, such as is described in U.S. Pat. No. 11,286,985.

In some embodiments, the bearing assembly is a journal bearing or an angular contact bearing (e.g., a conical bearing or spherical bearing). The bearing assemblies are not limited to the specific exemplary bearing assemblies shown in the Figures herein. Some embodiments include a bearing assembly that includes one or more of the diamond bearing surfaces engaged with one or more of the opposing metal bearing surfaces. The diamond bearing surfaces are in sliding engagement with the opposing metal bearing surfaces. Depending on the desired configuration of the bearing assembly, the sliding engagement between the diamond bearing surface and the opposing metal bearing surface can be a flat surface interface, a curved (e.g., cylindrical) surface interface, or a combination of flat and curved surface interfaces.

The coefficient of friction (CoF) exhibited by the engagement between the diamond bearing surfaces and the opposing metal bearing surfaces disclosed herein can be less than 0.1, 0.09 or less, 0.08 or less, 0.07 or less, 0.06 or less, 0.05 or less, 0.04 or less, 0.03 or less, 0.02 or less, or 0.01 or less. The CoF exhibited by the engagement between the diamond bearing surfaces and the opposing metal bearing surfaces disclosed herein ranges from 0.01 to 0.09, or 0.01 to 0.07, or 0.01 to 0.05, or 0.01 to 0.03, or any range or discrete value therebetween.

Exemplary Bearing Assemblies

FIG. 1A depicts an exemplary bearing assembly. Bearing assembly 100a includes a plurality of discrete polycrystalline diamond bearing elements 102. Each polycrystalline diamond bearing element 102 includes a support 104, such as a tungsten carbide support, and a polycrystalline diamond table 106. Each diamond table 106 has a diamond bearing surface 108. While not shown, each polycrystalline diamond bearing element 102 may be coupled with or a part of another component, such as a bearing housing.

The bearing assembly 100a includes an opposing bearing element 110. The opposing bearing element 110 includes a metal bearing surface 112. The opposing bearing element 110 and the polycrystalline diamond bearing elements 102 are arranged relative to one another such that each diamond bearing surface 108 is in sliding contact with the metal bearing surface 112. In the embodiment depicted, each diamond bearing surface 108 is a flat PDC face. The plurality of polycrystalline diamond bearing elements 102 can be arranged relative to the opposing bearing element 110 such that the diamond bearing surfaces 108 of the polycrystalline diamond bearing elements 102 present a "substantially continuous" bearing surface for engagement with the metal bearing surface 112. The opposing bearing element 110 can be a metal cylinder shaft, such as a component of a motor for a rocket or missile.

The opposing bearing element 110 and the polycrystalline diamond bearing elements 102 move relative to one another, such that the metal bearing surface 112 slides along the diamond bearing surfaces 108. For example, the opposing bearing element 110 can rotate along rotational direction 124, slide along direction 126 (in and out of the page), or combinations thereof.

While the opposing bearing element 110 is shown surrounded by a plurality of polycrystalline diamond bearing elements 102, this arrangement can be reversed. For example, in FIG. 1B the bearing assembly 100b is the same as bearing assembly 100a with the exception that the plurality of polycrystalline diamond bearing elements 102 are arranged on bearing element 101, the opposing bearing element 110 surrounds the plurality of polycrystalline diamond bearing elements 102, and the polycrystalline diamond bearing elements 102 have a domed engagement surface.

Figure 1B:
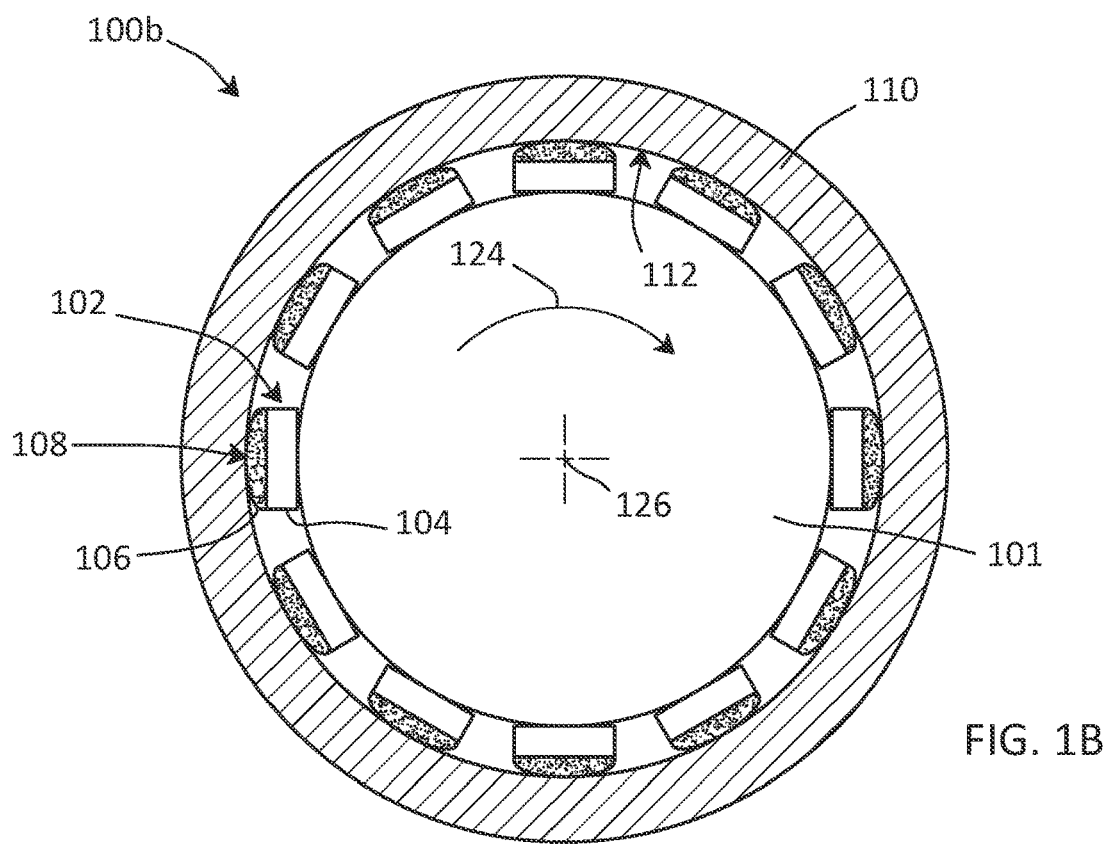
FIG. 1B is a perspective view of another bearing assembly that includes multiple polycrystalline bearing elements in sliding contact with a metal bearing surface.
Figure 1C:
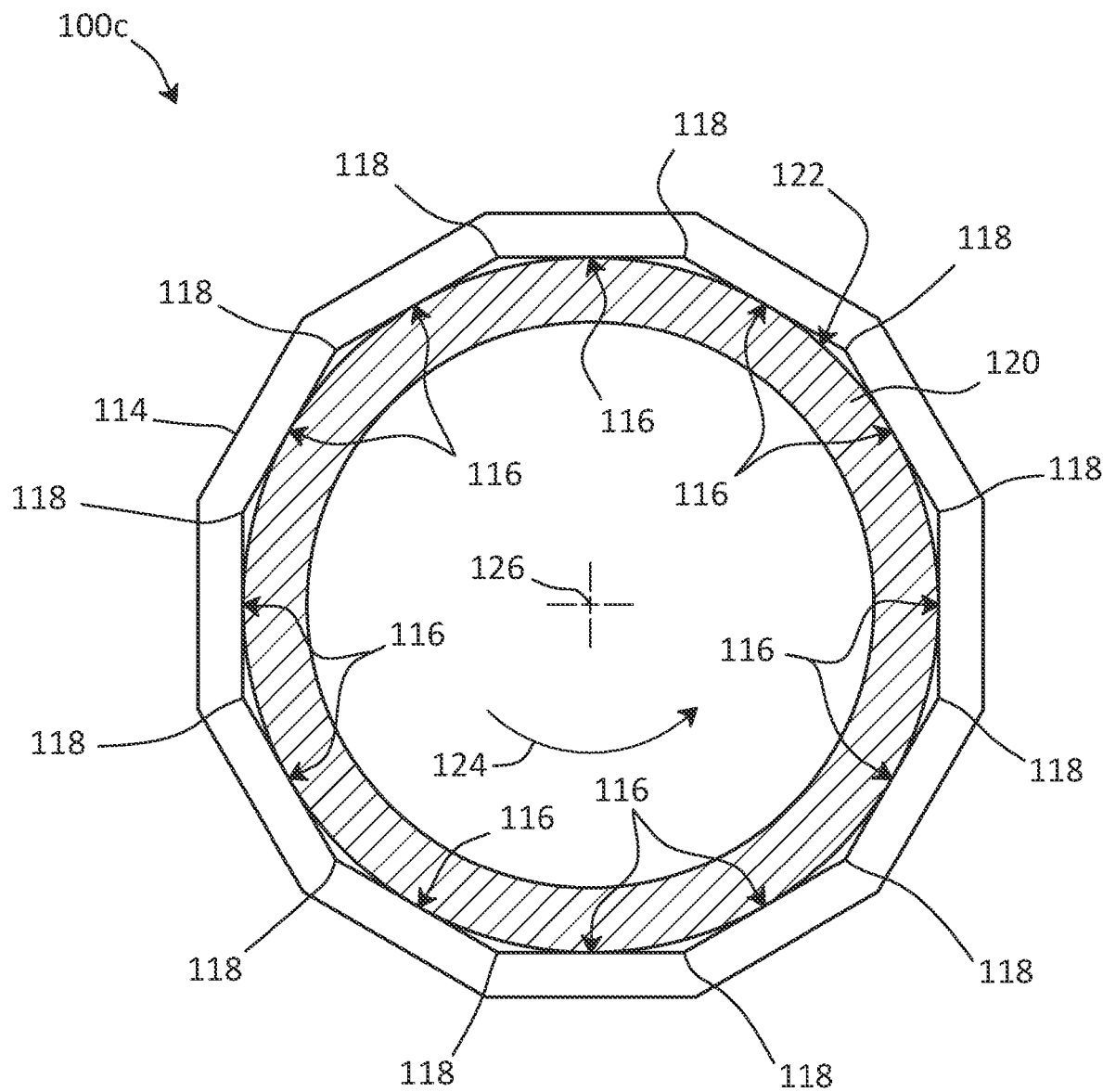
FIG. 1C is a perspective view of a bearing assembly that includes a polycrystalline bearing ring in sliding contact with a metal bearing surface.

FIG. 1C depicts another exemplary bearing assembly. Bearing assembly 100c includes a polycrystalline diamond bearing ring 114. The polycrystalline diamond bearing ring 114 includes a plurality of discrete polycrystalline diamond bearing surfaces 116, as defined between surfaces edges 118 on the ring 114.

The bearing assembly 100c includes an opposing bearing element 120. The opposing bearing element 120 includes a metal bearing surface 122. The opposing bearing element 120 and the polycrystalline diamond bearing ring 114 are arranged relative to one another such that each diamond bearing surface 116 is in sliding contact with the metal bearing surface 122. In the embodiment depicted, each diamond bearing surface 108 is a flat PDC face on the ring 114. The plurality of flat diamond bearing surfaces 108 may, together, approximate a single curved surface (e.g., an internal surface of a cylinder).

The polycrystalline diamond bearing ring 114 can be arranged relative to the opposing bearing element 120 such that the diamond bearing surfaces 116 present a "substantially continuous" bearing surface for engagement with the metal bearing surface 122. The opposing bearing element 120 can be a metal cylinder shaft, such as a component of a motor for a rocket or missile.

In some embodiments, the diamond bearing disclosed herein is a journal bearing (e.g., radial journal bearing) having a diamond bearing surface. The diamond bearings can have the form of a ring, such as is shown in FIG. 1C. The internal surface of the ring can include a plurality of segmented diamond bearing surfaces (e.g., 116) arranged to extend axially along the entirety of the internal circumference of bearing. Each diamond bearing surface has lateral boundary edges and longitudinal boundary edges (e.g., 118). As used herein, "boundary edges" of a surface are edges that are or define the perimeter of the surface. The lateral boundary edges of each diamond bearing surface can extend parallel to one another about a portion of the circumference of the bearing, and the longitudinal boundary edges of each diamond bearing surface can extend parallel to one another along the axial extent of the bearing. However, the diamond bearing surfaces disclosed herein are not limited to this particular shape and arrangement.

Each diamond bearing surface (e.g., 116) can be a separate surface from the adjacent diamond bearing surfaces. In some embodiments, each diamond bearing surface is a surface of a discrete diamond bearing element that is discrete from the adjacent diamond bearing elements, such that the adjacent diamond bearing elements and surfaces are not in contact. In some embodiments, the longitudinal boundary edge between two adjacent diamond bearing surfaces is a groove formed into a single diamond bearing element, such that the diamond bearing surface of the single diamond bearing element is modified to have multiple segmented diamond bearing surfaces.

The diamond bearings can have a cavity within which is positioned the opposing bearing element (e.g., shaft 120). The shaft may be axially slidable, rotatable, or combinations thereof within the cavity such that the exterior surface of the shaft is an opposing bearing surface that is slidingly engaged with the diamond bearing surfaces.

In some embodiments, an entirety of the surface area of opposing bearing surface is engaged with less than an entirety of the surface area of each of the diamond bearing surfaces. The portion of a diamond bearing surface that the opposing bearing surface is engaged with during operation of bearing assembly is the "diamond contact area" of that diamond bearing surface.

The opposing engagement surface(s) may be slidingly engaged with the diamond engagement surface(s) of the bearing assembly along a diamond contact area of the diamond engagement surface. As used herein, "diamond contact area" refers to the portion of the surface area of the diamond engagement surface that contacts the opposing engagement surface during operation of the bearing. That is, the diamond engagement surface is the surface area of the diamond bearing element that is available for contact as a bearing surface, and the diamond contact area is the portion of the surface area of the diamond engagement surface that contacts (directly or through a fluid film) the opposing engagement surface during operation of the bearing. In some embodiments, the diamond contact area has a surface area that is less than a surface area of the diamond engagement surface. That is, less than an entirety of the diamond engagement surface forms the diamond contact area of the diamond bearing. In some embodiments, such as in a radial bearing, the diamond contact area is a radial contact area. That is, the sliding movement of the opposing engagement surface along the diamond contact area on the diamond engagement surface is a radial, rotating movement along the diamond contact area. In other embodiments, the diamond contact area is an axial contact area. That is, the sliding movement of the opposing engagement surface on the diamond engagement surface is an axial movement along the diamond contact area. In some embodiments, the diamond contact area is both a radial and axial diamond contact area.

In some embodiments, the diamond bearings disclosed herein have discontinuous diamond bearing surfaces. For example, a bearing component (e.g., a radial journal bearing) having diamond bearing surfaces may be coupled with an opposing bearing component (e.g., a shaft) having an opposing bearing surface such that the opposing bearing is slidingly engaged with the diamond bearing surfaces along a diamond contact area of the diamond bearing surfaces, and such that the diamond bearing surfaces are "discontinuous" along the diamond contact area. As used herein, diamond bearing surfaces are "discontinuous surface" along a diamond contact area when the diamond bearing surfaces are interrupted by at least one boundary edge throughout the diamond contact area. That is, during operation, while the opposing bearing surface slides along the diamond contact area, the opposing bearing surface slides on, along, or in contact with at least one boundary edge of the diamond bearing surfaces.

While the diamond engagement surfaces disclosed herein include discontinuous diamond bearing surfaces, the diamond engagement surfaces may be treated, prepared, and/or arranged to reduce edge contact between the diamond engagement surfaces and the opposing engagement surfaces. In some embodiments, the boundary edges of the diamond bearing surfaces are beveled edges, radiused edges, or honed edges, such that the opposing bearing surface can slide over the boundary edges without (or with reduced) gouging as a result of edge contact with the boundary edges of the diamond. A performance criterion, in some embodiments, is that the diamond bearing elements are configured and positioned in such a way as to minimize or preclude edge contact with the opposing bearing surface. In some aspects, the diamond bearing elements are subjected to edge radius treatment to facilitate avoidance of edge contact with the opposing bearing surface. In some embodiments, the edge geometry of the diamond bearing element is subjected to a surface roughness reduction process, such as lapping and/or polishing. In other embodiments, the edge geometry of the polycrystalline diamond element is not subjected to a surface roughness reduction process. The diamond bearing surfaces disclosed herein may be planar, convex, or concave.

In some embodiments, adjacent diamond bearing elements are positioned relative to one another such that the diamond bearing elements are contiguous or nearly contiguous, and such that the adjacent diamond bearing surfaces thereof are flush or nearly flush with each other at the adjoining boundary edges thereof. For example, adjacent diamond bearing surfaces can be positioned relative to one another such that the diamond bearing surfaces are flush or nearly flush with each other at the boundary edges therebetween. The provision of flush or nearly flush adjacent bearing surfaces, in combination with lapping and/or polishing of the diamond bearing surfaces, provides an array of multiple diamond bearing surfaces that, together, provide a contiguous or near contiguous bearing contact path for engagement with the metal bearing surface. The multiple diamond bearing surfaces are lapped and/or polished and arranged relative to one another such that the multiple diamond bearing surfaces, together, form a "substantially continuous surface." As used herein, multiple (or a plurality of) diamond bearing surfaces form a "substantially continuous surface" along the diamond contact areas of the diamond bearing surfaces when the diamond bearing surfaces are only interrupted by boundary edges throughout the diamond contact area where adjacent diamond bearing surfaces are flush or nearly flush. For example, during operation, while the opposing metal bearing surface slides along the diamond contact area, the opposing metal bearing surface slides on, along, and/or in contact only with boundary edges of the diamond bearing surfaces where the adjacent diamond bearing surfaces are flush or nearly flush. In some such embodiments, the adjacent diamond bearing elements are not spaced apart, and are in contact with one another, such that the bearing assembly includes an array of diamond bearing elements that are discrete but in contact with one another.

In some embodiments, edge treatment (e.g., radiused edges) of the boundary edges of the diamond bearing surfaces, in combination with lapping and/or polishing of the diamond bearing surfaces and relative positioning of the diamond bearing surfaces, may provide an array of multiple diamond bearing surfaces that, together, provide a bearing contact path for engagement with the metal bearing surface. For example, during operation, while the opposing metal bearing surface slides along the diamond contact area, the opposing metal bearing surface slides on, along, or in contact only with boundary edges of the diamond bearing surfaces that have been subjected to edge treatment (e.g., that are beveled, radiused, chamfered).

The bearing assemblies disclosed herein are not limited to the arrangements shown in FIGS. 1A-1C, and may be arranged into other bearing configurations. Each of FIGS. 1-6 of U.S. Pat. No. 10,465,775 are incorporated herein in their entirety as exemplary arrangements of the diamond and metal bearing surfaces disclosed herein in to form of a cam and cam follower. Each of FIGS. 2A-13B of U.S. Pat. No. 10,738,821 are incorporated herein in their entirety as exemplary arrangements of the diamond and metal bearing surfaces disclosed herein in to form of a radial bearing. Each of FIGS. 2A-10B of U.S. Pat. No. 10,760,615 are incorporated herein in their entirety as exemplary arrangements of the diamond and metal bearing surfaces disclosed herein in to form of a thrust bearing. Each of FIGS. 3-8 of U.S. Pat. No. 11,014,759 are incorporated herein in their entirety as exemplary arrangements of the diamond and metal bearing surfaces disclosed herein in to form of a roller ball assembly. Each of FIGS. 1A-9 of U.S. Pat. No. 11,225,842 are incorporated herein in their entirety as exemplary arrangements of the diamond and metal bearing surfaces disclosed herein in to form of a tubular protection assembly. Each of FIGS. 14A-19D of U.S. Pat. No. 11,187,040 are incorporated herein in their entirety as exemplary arrangements of the diamond and metal bearing surfaces disclosed herein in to form of a drilling motor. Each of FIGS. 1-11 of U.S. Pat. No. 11,286,985 are incorporated herein in their entirety as exemplary arrangements of the diamond and metal bearing surfaces disclosed herein in to form of a bearing assembly with compliance. Each of FIGS. 1A-10D of U.S. Pat. No. 11,371,556 are incorporated herein in their entirety as exemplary arrangements of the diamond and metal bearing surfaces disclosed herein in to form of a linear bearing. Each of FIGS. 1A-6 of U.S. Pat. No. 11,054,000 are incorporated herein in their entirety as exemplary arrangements of the diamond and metal bearing surfaces disclosed herein in to form of a power transmission surface. Each of FIGS. 7A-21C of U.S. Patent Publication No. 2022/0243788 are incorporated herein in their entirety as exemplary arrangements of the diamond and metal bearing surfaces disclosed herein in to form of a driveline. Each of FIGS. 10-15B of U.S. Patent Publication No. 2022/0178214 are incorporated herein in their entirety as exemplary arrangements of the diamond and metal bearing surfaces disclosed herein in to form of a tubular protection assembly. Each of FIGS. 1A-9E of U.S. Patent Publication No. 2022/0145933 are incorporated herein in their entirety as exemplary arrangements of the diamond and metal bearing surfaces disclosed herein having continuous bearing surfaces. Each of FIGS. 1-2D of U.S. Patent Publication No. 2022/0145934 are incorporated herein in their entirety as exemplary arrangements of the diamond and metal bearing surfaces disclosed herein in the form of a split radial bearing. Each of FIGS. 3A-6D of U.S. Patent Publication No. 2022/0145934 are incorporated herein in their entirety as exemplary arrangements of the diamond and metal bearing surfaces disclosed herein in the form of a valve.

Methods of Making the Diamond Surfaces

In some embodiments, the diamond bearing and engagement surfaces disclosed herein are made by a high-pressure and high-temperature process (HPHT diamonds). In some embodiments, the diamond surfaces disclosed herein are made by CVD or PVD of a diamond layer. The thickness of the diamond layer that has the diamond surfaces may be 0.200" or less, or 0.150" or less, or 0.100" or less, or 0.09" or less, or 0.08" or less, or 0.07" or less, or 0.06" or less, or 0.05" or less, or 0.04" or less, or 0.03" or less, or 0.02" or less, 0.010" or less. The thickness of the diamond layer that has the diamond surface may be from 0.010" to 0.200", from 0.02" to 0.150", from 0.03" to 0.100", from 0.04" to 0.09", from 0.05" to 0.08", from 0.06" to 0.07", or any range or discrete value therebetween. For example, when the diamond layer is made via CVD or PVD, the thickness of the diamond layer that has the diamond surface may be 0.010" or less, and when the diamond layer is made by a high-pressure and high-temperature process the thickness of the diamond layer that has the diamond surface may be 0.200" or less. In some embodiments, the diamond is leached, un-leached, or leached and backfilled. As an example, to make a diamond layer using the CVD process, seed diamond particles are attached to a substrate and then placed in a chamber under conditions sufficient to promote the crystalline growth of the seed diamond particles.

Methods of Designing, Making, and Using Bearings for Cryogenic Applications

Figure 2:
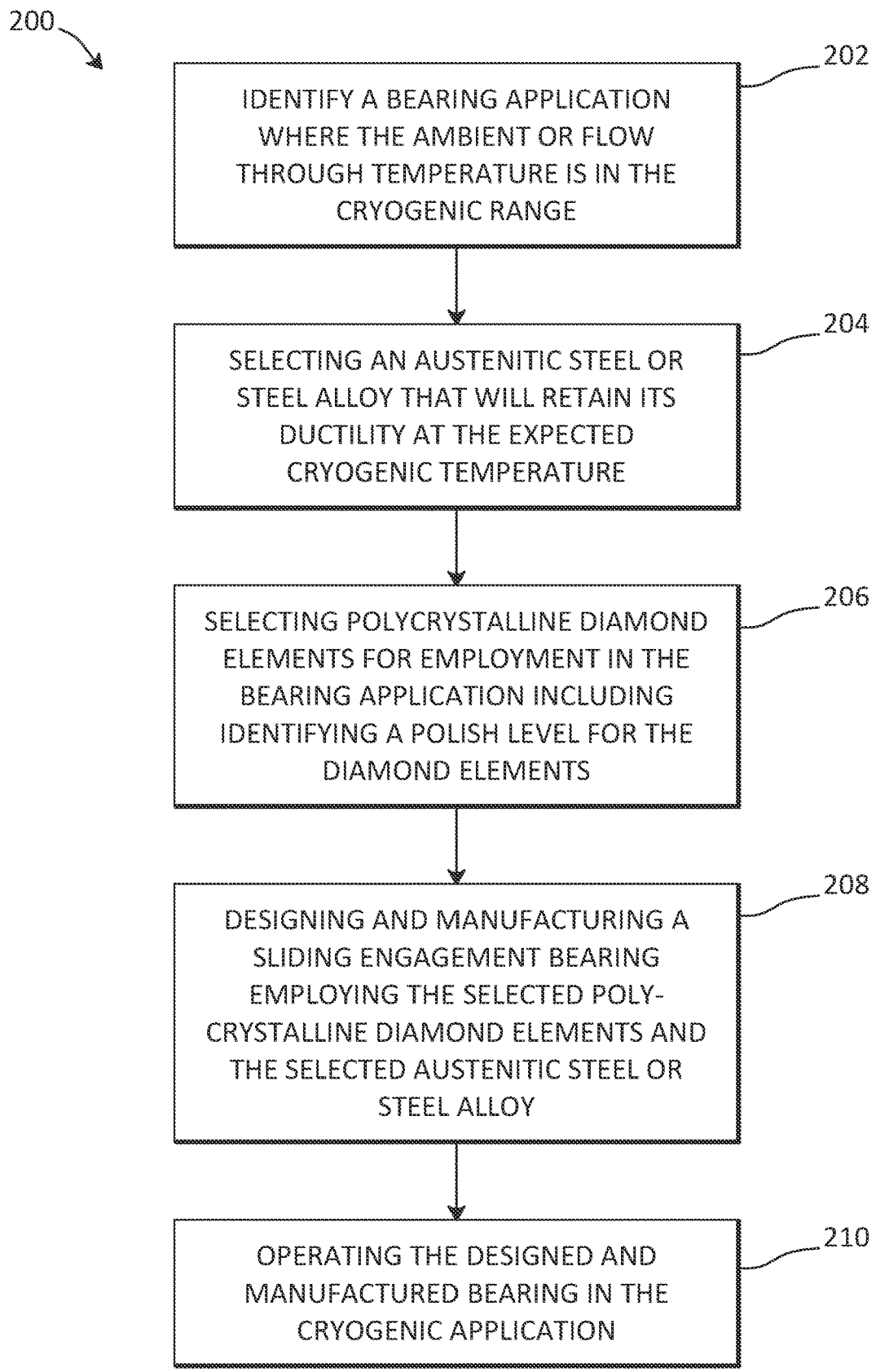
FIG. 2 is a flow chart of a method for designing and using a bearing assembly for use in a cryogenic environment.

Some embodiments include methods of designing and making bearings for cryogenic applications. With reference to FIG. 2, method 200 includes identifying a bearing application where the ambient or flow through temperature is in the cryogenic temperature range, step 202.

Method 200 includes selecting an austenitic steel or steel alloy that will retain ductility within the expected cryogenic temperature range, step 204. Austenitic steel or steel alloy are examples, but other metals may be selected. In some embodiments, selecting the metal includes subjecting the metal to a Charpy impact test (or another impact test) at cryogenic temperatures to assess the suitability of the metal for use in cryogenic conditions.

Method 200 includes selecting polycrystalline diamond elements for use as bearing elements, step 206. Selecting polycrystalline diamond elements can include identifying a polish level for the diamond bearing surfaces of the polycrystalline diamond elements.

Method 200 includes designing and manufacturing a sliding engagement bearing that includes the selected polycrystalline diamond elements and the selected austenitic steel or steel alloy, step 208. In the sliding engagement, the diamond bearing surfaces are in sliding contact with metal bearing surfaces of the austenitic steel or steel alloy.

Method 200 includes operating the bearing within the cryogenic temperature range for the application, step 210. In operation, the bearings disclosed herein may operate at surface speeds of up to 60,000 RPMs. In some embodiments, the bearings disclosed herein may operate at a maximum contact stress of up to 1.63 GPa. During operation of the bearings disclosed herein, a fluid film may be positioned between the diamond and metal bearing surfaces.

The method of making and using the bearings disclosed herein is not limited to the particular exemplary method of FIG. 2. For example, some steps may be added to those of FIG. 2, some steps in FIG. 2 may be eliminated or modified, and the order of the steps in FIG. 2 may be changed.

Cryogenic Treatment of Diamond

The diamond bearing elements disclosed herein can be subjected to cryogenic treatment. For example, the diamond bearing elements can be placed into a cryogenic chamber and subjected to cryogenic temperatures (i.e., temperatures of −150° C. or lower, or from −150° C. to −253° C.) for a period of time. In some embodiments a plurality of diamond bearing elements are subjected to such cryogenic treatment. A portion of the diamond bearing elements subjected to the cryogenic treatment may, as a result of the cryogenic treatment, exhibit internal flaws or weaknesses (e.g., cracking, breaking, or otherwise brittle fracturing of the diamond material). By subjecting the plurality of diamond bearing elements to such cryogenic treatment, the diamond bearing elements that do not exhibit internal flaws or weaknesses as a result of the cryogenic treatment can be identified and used in the bearing assemblies disclosed herein, and the diamond bearing elements that do exhibit internal flaws or weaknesses as a result of the cryogenic treatment can be identified and excluded from the bearing assemblies disclosed herein. Thus, the cryogenic treatment of can be used as a qualification step to select diamond material that is more suitable for use in cryogenic conditions. The determination of the presence of brittle fraction in the diamond material after the cryogenic treatment can be performed by Ultrasonic testing (UT). The cryogenic treatment can, for example, be part of the selecting step 206 of FIG. 2. U.S. Pat. No. 8,235,767 ('767 patent) discloses cryogenic treatment processes for diamond abrasive tools. In some embodiments, the diamond bearing elements disclosed herein are treated in accordance with the cryogenic treatment processes disclosed in the '767 patent. For example, the diamond bearing elements disclosed herein can be treated in a system as shown in FIG. 1 of the '767 patent, and can be subjected to a cryogenic treatment process in accordance with FIG. 2 of the '767 patent.

APPLICATIONS

While the bearing assemblies disclosed herein are not limited to particular applications, an exemplary application of the bearings is in turbopump rockets and missile applications, such as in rocket and missile motors. The bearings can be used in compression and pumping of liquefied gases and turbine engines that use cryogenic fuels, where the bearing can be cooled by the cryogenic fuel directly or indirectly.

The bearings can be used various low-temperature environments, such as high-altitude environments, extra-atmospheric environments (i.e., space), or other environments where the bearing is exposed to low ambient temperatures.

Although the present embodiments and advantages have been described in detail, it should be understood that various changes, substitutions and alterations can be made herein without departing from the spirit and scope of the disclosure. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A bearing assembly for use in low-temperature conditions, the bearing assembly comprising: a cryogenically treated polycrystalline diamond bearing element having a diamond bearing surface; an opposing bearing element having a metal bearing surface, wherein the metal bearing surface comprises a metal, the metal containing at least 2 weight percent of a diamond solvent-catalyst based on a total weight of the metal, and wherein the metal is ductile at a temperature of −150° C.; and wherein the metal bearing surface is in contact with the diamond bearing surface.

2. The bearing assembly of claim 1, wherein the metal is ductile at temperatures ranging from −150° C. to −253° C.

3. The bearing assembly of claim 1, wherein the metal is ductile at temperatures ranging from −150° C. to −196° C. when subjected to a Charpy impact test performed in accordance with ASTM-E23-18.

4. The bearing assembly of claim 1, wherein the metal bearing surface is in sliding contact with the diamond bearing surface.

5. The bearing assembly of claim 1, wherein the metal is a metal alloy.

6. The bearing assembly of claim 5, wherein the metal is an alloy steel.

7. The bearing assembly of claim 6, wherein the alloy steel contains from 3.5 to 11 wt. % nickel based on a total weight of the alloy steel.

8. The bearing assembly of claim 5, wherein the metal is a nickel alloy.

9. The bearing assembly of claim 5, wherein the metal is a titanium alloy.

10. The bearing assembly of claim 5, wherein the metal is an austenitic steel.

11. The bearing assembly of claim 1, wherein the metal is a metal alloy, and wherein the diamond solvent-catalyst comprises iron, cobalt, nickel, titanium, copper, chromium, manganese, tantalum, or a combination thereof.

12. The bearing assembly of claim 11, wherein the metal contains at least 2 weight percent of iron based on the total weight of the metal.

13. The bearing assembly of claim 11, wherein the metal contains at least 2 weight percent of cobalt based on the total weight of the metal.

14. The bearing assembly of claim 11, wherein the metal contains at least 2 weight percent of nickel based on the total weight of the metal.

15. The bearing assembly of claim 11, wherein the metal contains at least 2 weight percent of titanium based on the total weight of the metal.

16. The bearing assembly of claim 11, wherein the metal contains at least 2 weight percent of copper based on the total weight of the metal.

17. The bearing assembly of claim 11, wherein the metal contains at least 2 weight percent of chromium based on the total weight of the metal.

18. The bearing assembly of claim 11, wherein the metal contains at least 2 weight percent of manganese based on the total weight of the metal.

19. The bearing assembly of claim 11, wherein the metal is a metal alloy that contains at least 2 weight percent of tantalum based on the total weight of the metal.

20. The bearing assembly of claim 1, wherein the metal is softer than a superhard material.

21. The bearing assembly of claim 1, wherein the metal has a hardness value of less than 25 GPa as determined in accordance with ASTM E92-17.

22. The bearing assembly of claim 1, wherein the opposing bearing element is a metal cylinder shaft.

23. The bearing assembly of claim 1, wherein the bearing assembly comprises a bearing ring having a plurality of the cryogenically treated polycrystalline diamond bearing elements with diamond bearing surfaces thereon, and wherein the opposing bearing element is a metal cylinder shaft positioned within the bearing ring.

24. The bearing assembly of claim 1, wherein the cryogenically treated polycrystalline diamond bearing element is a cryogenically treated polycrystalline diamond compact.

25. The bearing assembly of claim 1, wherein a coefficient of friction between the diamond bearing surface and the metal bearing surface is 0.09 or less.

26. The bearing assembly of claim 1, wherein the bearing assembly is a radial bearing, an axial bearing, a cam and cam follower assembly, or a roller ball assembly.

27. The bearing assembly of claim 1, wherein the bearing assembly is a conical bearing or a linear bearing.

28. The bearing assembly of claim 1, wherein the bearing assembly is a journal bearing.

29. The bearing assembly of claim 1, wherein the diamond bearing surface and the metal bearing surface are power transmission surfaces.

30. The bearing assembly of claim 1, wherein the metal is ductile at temperatures in which hydrogen, methane, natural gas, oxygen, nitrogen, and helium are in a liquid state.

31. The bearing assembly of claim 1, wherein the metal is softer than tungsten carbide (WC).

32. The bearing assembly of claim 1, wherein the metal has a hardness value of less than 15 GPa as determined in accordance with ASTM E92-17.

33. The bearing assembly of claim 1, wherein a surface roughness of the diamond bearing surface is 20 μin Ra or less.

34. The bearing assembly of claim 1, wherein the bearing assembly comprises a plurality of the cryogenically treated polycrystalline diamond bearing elements having diamond bearing surfaces, and wherein the metal bearing surface is in sliding contact with each of the diamond bearing surfaces.

35. The bearing assembly of claim 1, wherein the cryogenically treated polycrystalline diamond bearing element is leached and backfilled.

36. The bearing assembly of claim 1, wherein the cryogenically treated polycrystalline diamond bearing element comprises a thermally stable polycrystalline diamond sintered with a ceramic binder.

37. The bearing assembly of claim 1, wherein the opposing bearing element is cryogenically treated.

38. A system for use in low-temperature conditions, the system comprising: a bearing assembly including a cryogenically treated polycrystalline diamond bearing element and an opposing bearing element; the polycrystalline diamond bearing element having a diamond bearing surface; the opposing bearing element having a metal bearing surface, wherein the metal bearing surface comprises a metal, the metal containing at least 2 weight percent of a diamond solvent-catalyst based on a total weight of the metal, and wherein the metal is ductile at a temperature of −150° C.; and wherein the metal bearing surface is in contact with the diamond bearing surface.

39. The system of claim 38, wherein the system is operated in an extra-atmospheric environment.

40. The system of claim 38, wherein the system is the turbine engine that operates on cryogenic fuel.

41. The system of claim 40, wherein the system is operated in an extra-atmospheric environment.

42. A bearing assembly for use in low-temperature conditions, the bearing assembly comprising: a cryogenically treated polycrystalline diamond bearing element having a diamond bearing surface; a cryogenically treated opposing bearing element having a metal bearing surface, wherein the metal bearing surface comprises a metal alloy, the metal alloy containing at least 2 weight percent of a diamond solvent-catalyst based on a total weight of the metal alloy, wherein the metal alloy is ductile at a temperature of −150° C. when subjected to a Charpy impact test performed in accordance with ASTM-E23-18, and wherein the metal alloy has a hardness value of less than 25 GPa as determined in accordance with ASTM E92-17; and wherein the metal bearing surface is in sliding contact with the diamond bearing surface.

43. A system for use in low-temperature conditions, the system comprising:
a bearing assembly including a cryogenically treated polycrystalline diamond bearing element and an opposing bearing element; the cryogenically treated polycrystalline diamond bearing element having a diamond bearing surface; the opposing bearing element having a metal bearing surface, wherein the metal bearing surface comprises a metal, the metal containing at least 2 weight percent of a diamond solvent-catalyst based on a total weight of the metal, wherein the metal is ductile at a temperature of −150° C. to −196° C. when subjected to a Charpy impact test performed in accordance with ASTM-E23-18, and wherein the metal has a hardness value of less than 25 GPa as determined in accordance with ASTM E92-17; wherein the metal bearing surface is in sliding contact with the diamond bearing surface.

44. A bearing assembly for use in low-temperature conditions, the bearing assembly comprising: a cryogenically treated polycrystalline diamond bearing element having a diamond bearing surface; an opposing bearing element having a metal bearing surface, wherein the metal bearing surface comprises a metal, the metal containing at least 2 weight percent of a diamond solvent-catalyst based on a total weight of the metal; and wherein the metal bearing surface is in contact with the diamond bearing surface.

45. The bearing assembly of claim 44, wherein the metal is a metal alloy.

46. The bearing assembly of claim 45, wherein the metal alloy is an alloy steel.

47. The bearing assembly of claim 46, wherein the alloy steel contains from 3.5 to 11 wt. % nickel based on a total weight of the alloy steel.

48. The bearing assembly of claim 45, wherein the metal alloy is a nickel alloy.

49. The bearing assembly of claim 45, wherein the metal alloy is a titanium alloy.

50. The bearing assembly of claim 45, wherein the metal alloy is an austenitic steel.

* * * * *